United States Patent
Stein

(10) Patent No.: US 8,913,829 B2
(45) Date of Patent: Dec. 16, 2014

(54) AUTOMATIC PROCESSING SCALE ESTIMATION FOR USE IN AN IMAGE PROCESS

(75) Inventor: Andrew Neil Stein, Pittsburg, PA (US)

(73) Assignee: Tandent Vision Science, Inc., San Francisco, CA (US)

( * ) Notice: Subject to any disclaimer, the term of this patent is extended or adjusted under 35 U.S.C. 154(b) by 228 days.

(21) Appl. No.: 13/488,799

(22) Filed: Jun. 5, 2012

(65) Prior Publication Data

US 2013/0321419 A1 Dec. 5, 2013

(51) Int. Cl.
*G06K 9/00* (2006.01)
*G06K 9/34* (2006.01)

(52) U.S. Cl.
USPC .......................................... 382/170; 382/165

(58) Field of Classification Search
None
See application file for complete search history.

(56) References Cited

U.S. PATENT DOCUMENTS

| | | | | |
|---|---|---|---|---|
| 5,043,922 | A * | 8/1991 | Matsumoto | 345/422 |
| 7,596,266 | B2 | 9/2009 | Maxwell et al. | |
| 7,672,530 | B2 | 3/2010 | Friedhoff et al. | |
| 7,873,219 | B2 | 1/2011 | Friedhoff | |
| 7,995,058 | B2 | 8/2011 | Smith et al. | |
| 8,139,850 | B2 * | 3/2012 | Maxwell et al. | 382/164 |
| 8,139,867 | B2 | 3/2012 | Maxwell et al. | |
| 8,311,338 | B2 * | 11/2012 | Stein et al. | 382/191 |
| 8,452,109 | B2 * | 5/2013 | Alldrin et al. | 382/225 |
| 8,600,169 | B2 * | 12/2013 | Stein et al. | 382/191 |
| 2008/0175507 | A1 | 7/2008 | Lookingbill et al. | |
| 2009/0123070 | A1 | 5/2009 | Xiaoying | |
| 2010/0142805 | A1 * | 6/2010 | Maxwell et al. | 382/164 |
| 2010/0254629 | A1 | 10/2010 | Pigeon | |

FOREIGN PATENT DOCUMENTS

| | | |
|---|---|---|
| EP | 0590994 | 1/2002 |
| EP | 0974935 | 10/2004 |

OTHER PUBLICATIONS

Neilson et al, Segmentation of Soft Shadows Based on a Daylight- and Penumbra Model, Computer Vision/Computer Graphics Collaboration Techniques Lecture Notes in Computer Science vol. 4418, 2007, pp. 341-352.*
Y. Weiss, "Deriving Intrinsic Images From Image Sequences", ICCV 2001, pp. 68-75.*
Nielsen et al. "Segmentation of Soft Shadows based on a Daylight- and Penumbra Model." In: 5-8, 14-17 Computer Vision/Computer Graphics Collaboration Techniques. Mar. 30, 2007 [retrieved on Dec. 5, 2013]. Retrieved from the Internet: <URL: http://www.cvmt.aau.dk/-cbm/onlinepapers/mirage07shadowremoval.pdf>.

* cited by examiner

*Primary Examiner* — Andrae S Allison
(74) *Attorney, Agent, or Firm* — Davidson, Davidson & Kappel, LLC; Felix L. D'Arienzo, Jr.

(57) ABSTRACT

In a first exemplary embodiment of the present invention, an automated, computerized method is provided for processing an image. According to a feature of the present invention, the method comprises the steps of providing an image file depicting an image, in a computer memory, calculating processing scale parameter information as a function of width dimension information for penumbrae depicted in the image; and generating intrinsic illumination and material reflectance images corresponding to the image using the processing scale parameter information.

18 Claims, 23 Drawing Sheets

Log Color Space Chromaticity Plane

Figure 2: Pixel Array for Storing Image Data

| P(1, 1) | P(1, 2) | ... | P(1, M) |
|---------|---------|-----|---------|
| P(2, 1) | P(2, 2) | | |
| P(3, 1) | P(3, 2) | | |
| ... | | | |
| P(N, 1) | ... | ... | P(N, M) |

Image File 18

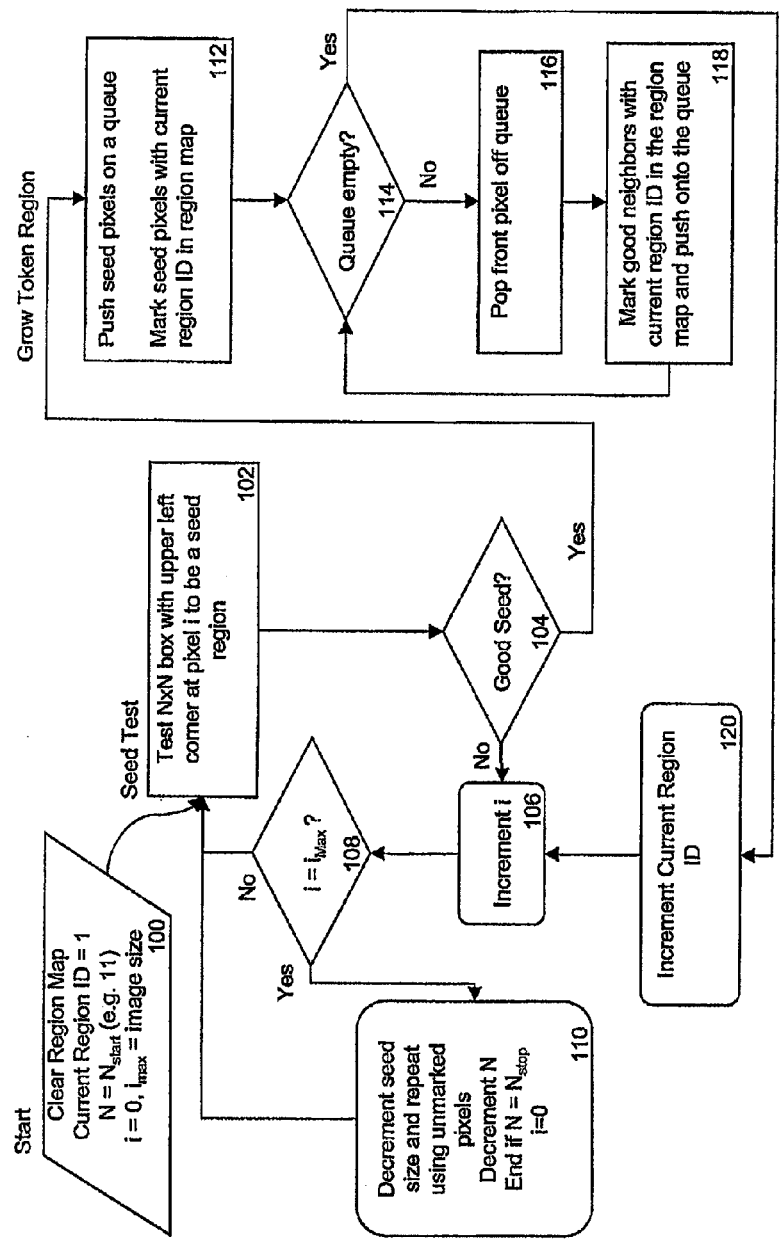
Figure 3A: Identifying Token Regions in an Image

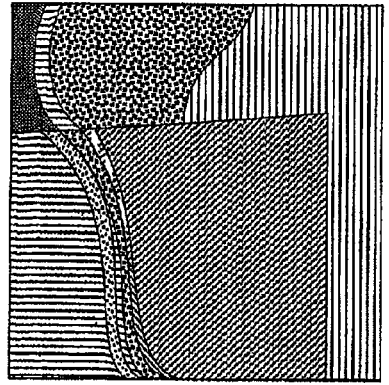
Figure 3B: Original Image
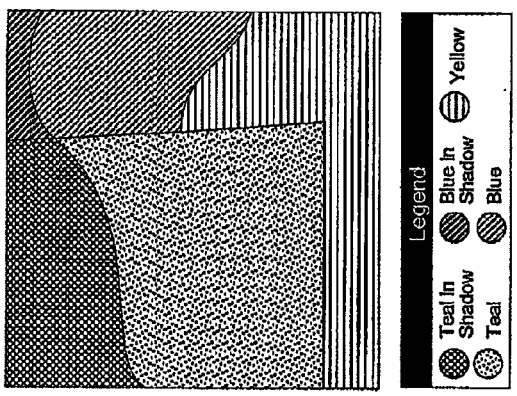
Figure 3C: Token Regions
Figure 3B, 3C: Examples of Identifying Token Regions in an Image

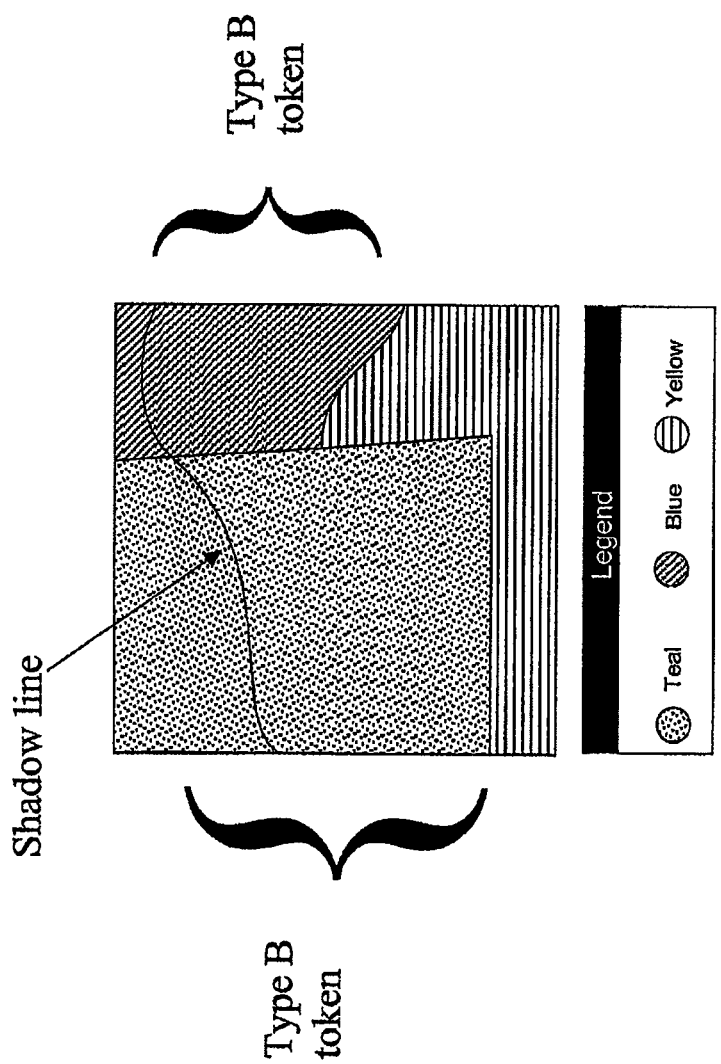
Figure 3D: Type B Tokens

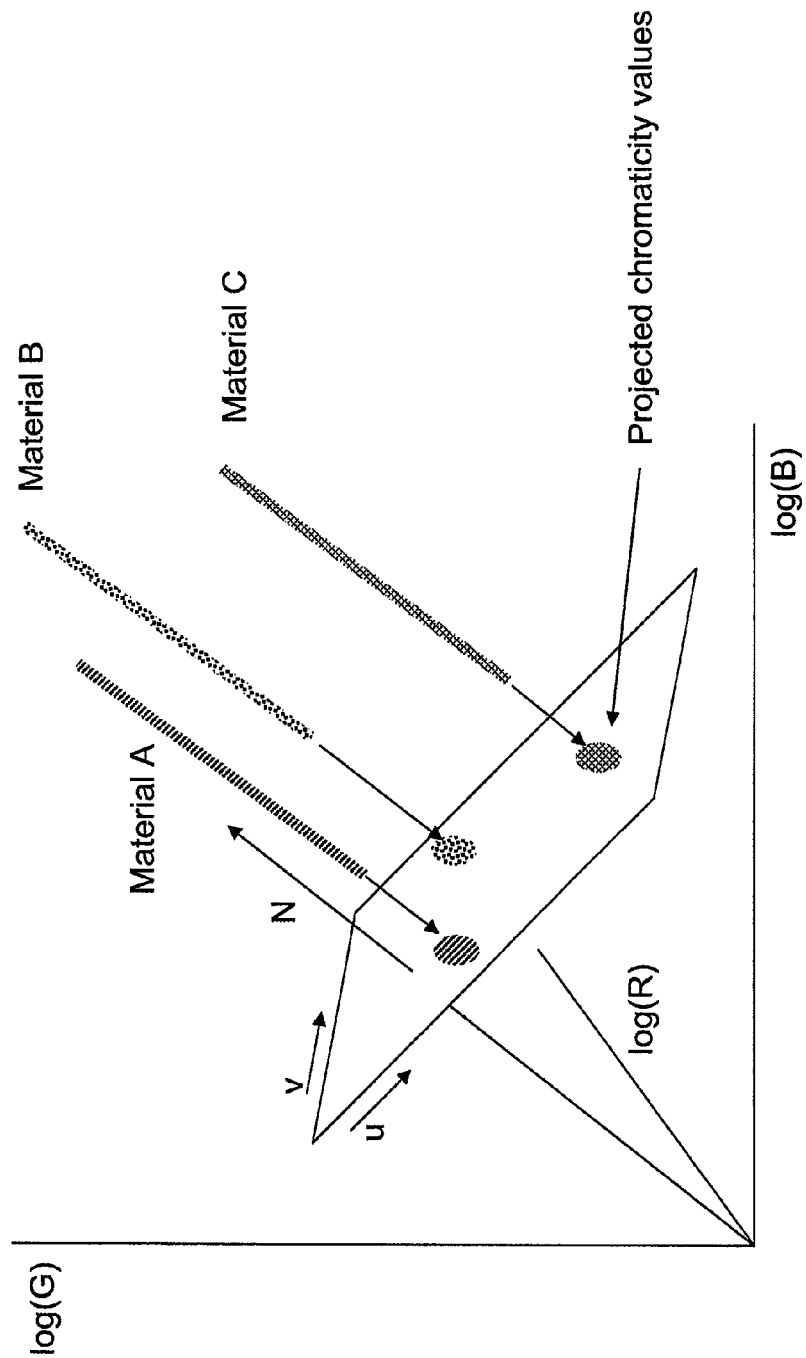
Figure 5: Log Color Space Chromaticity Plane

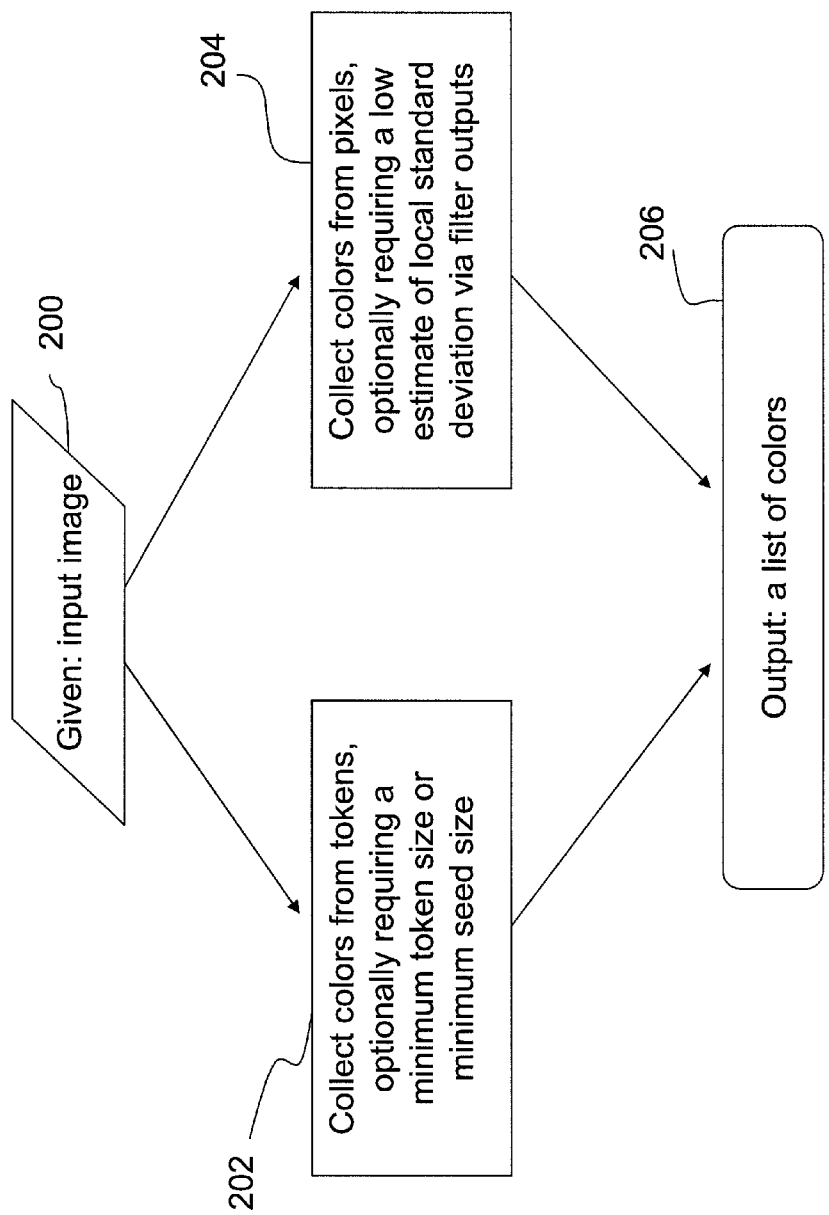
Figure 6: Selecting colors from an image

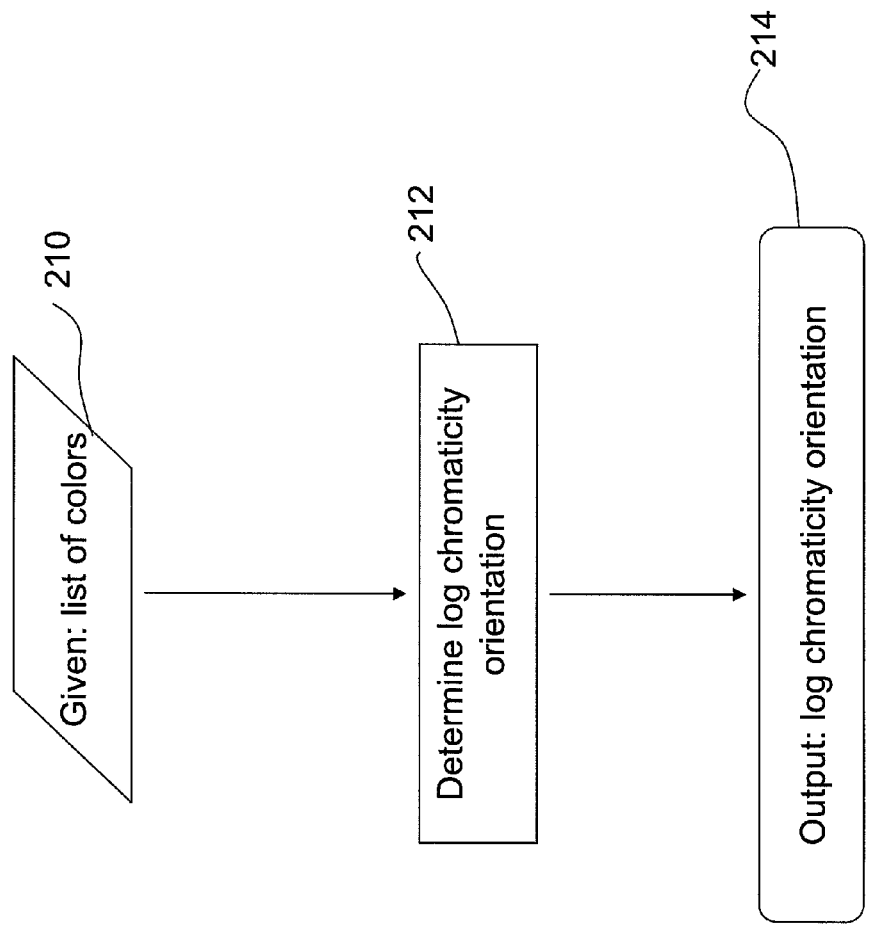
Figure 7: Determining the log chromaticity orientation

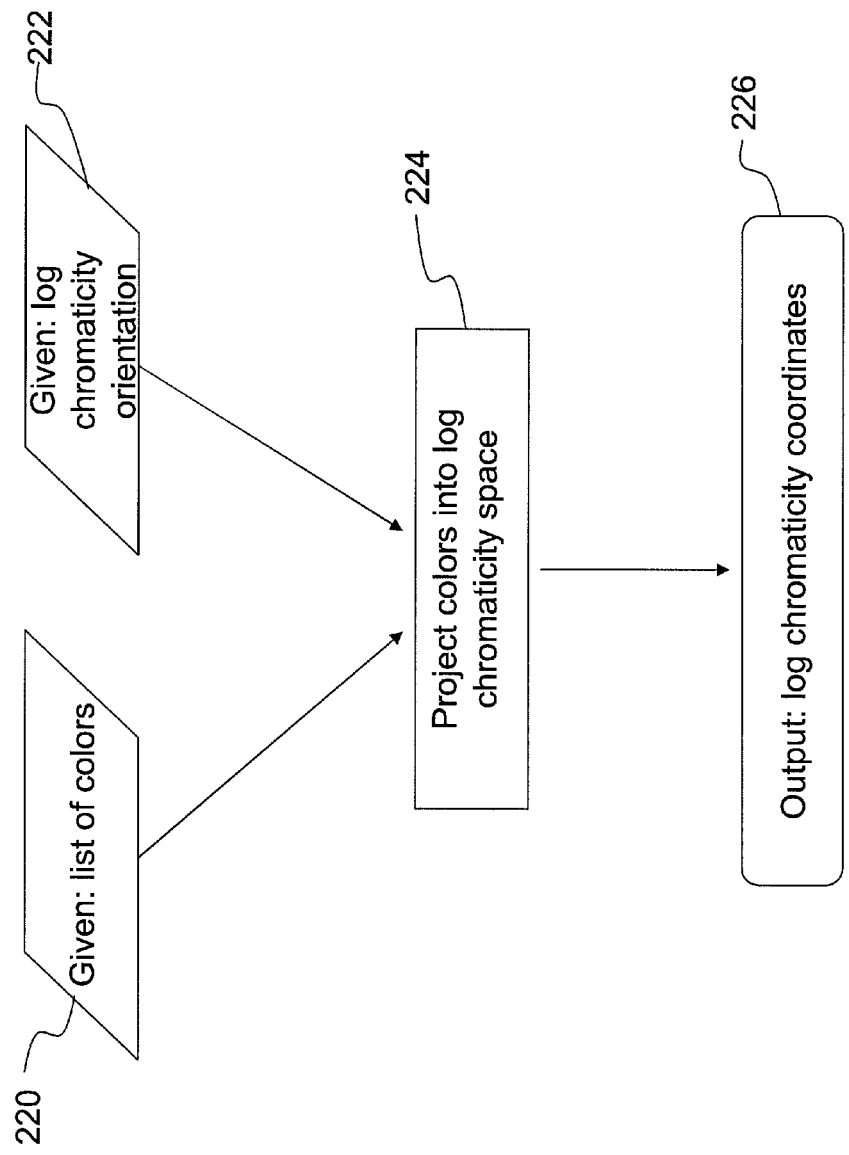
Figure 8: Determining log chromaticity coordinates

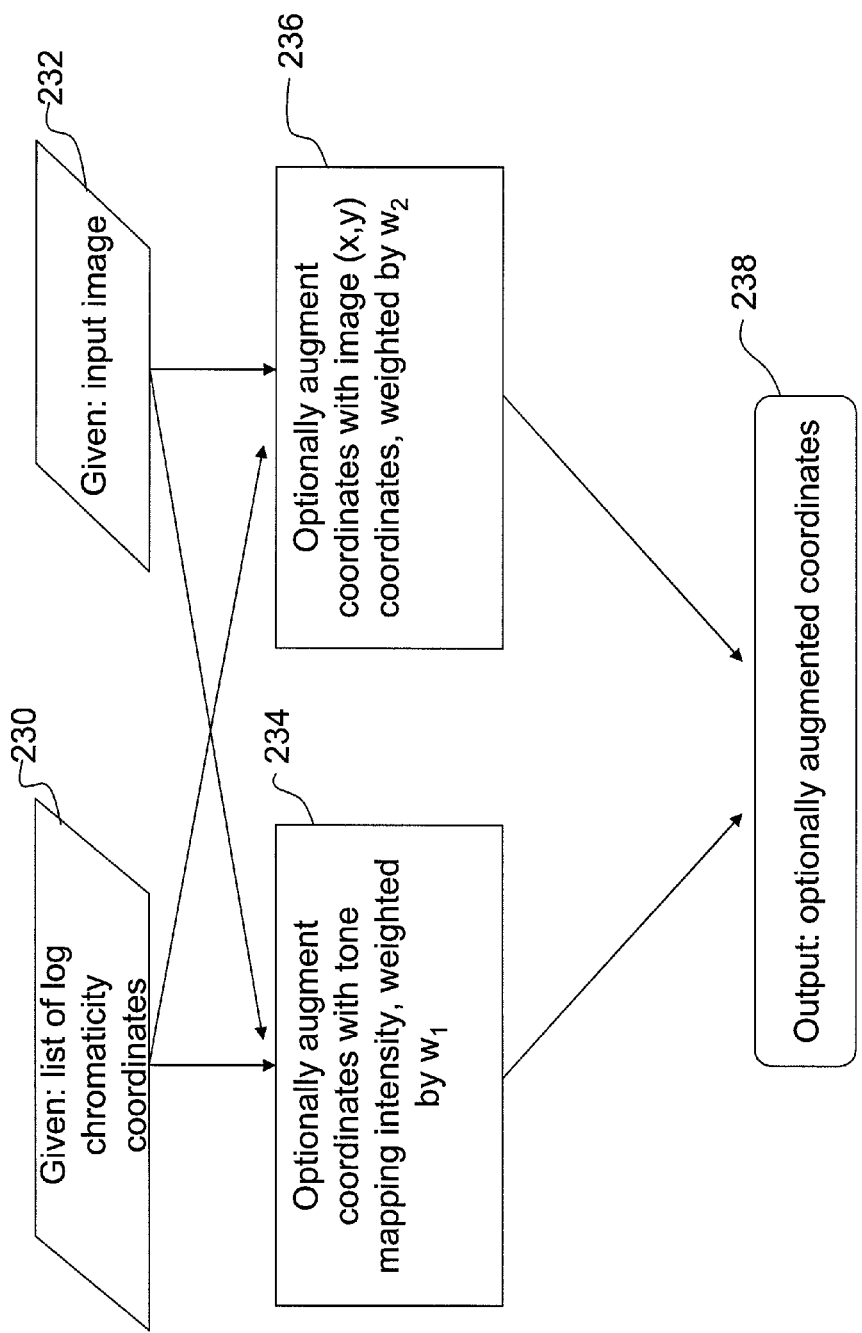
Figure 9: Optionally augmenting log chromaticity coordinates

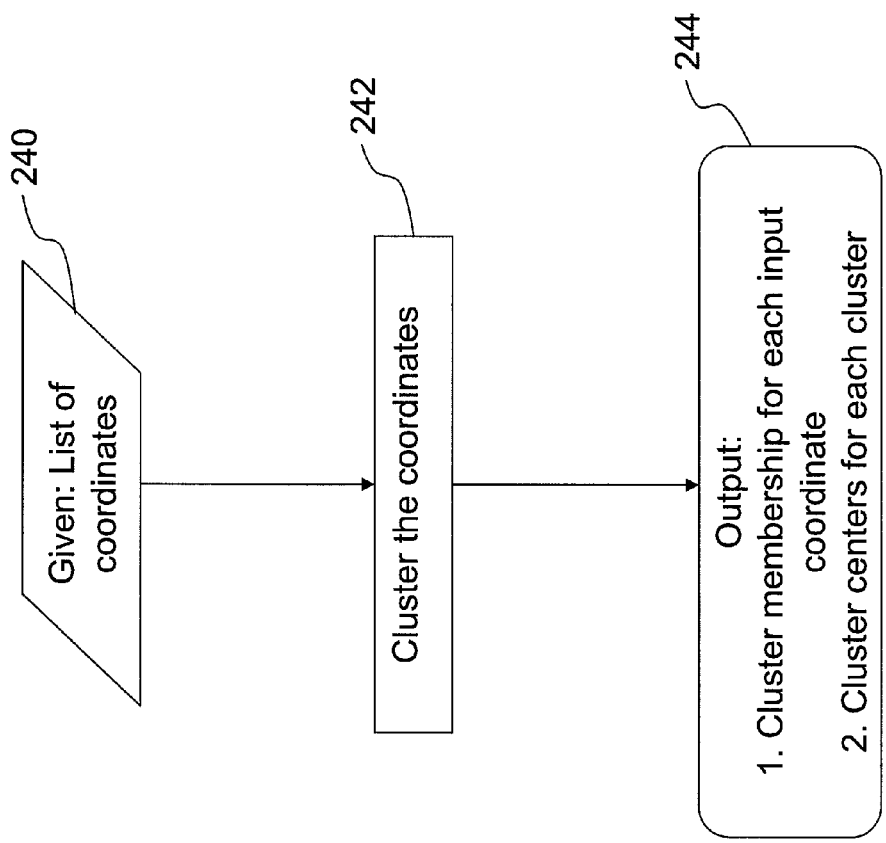
Figure 10: Clustering log chromaticity coordinates

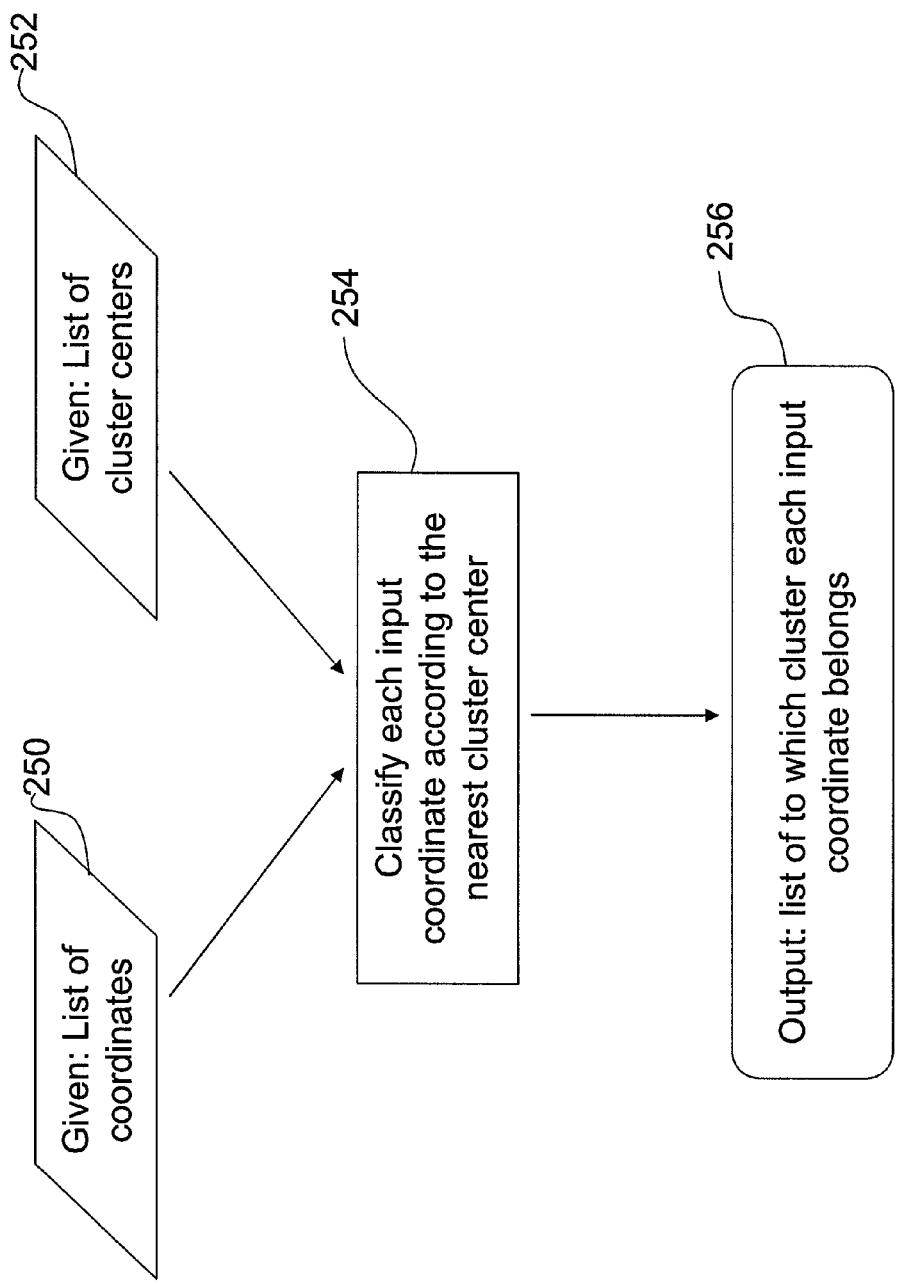
Figure 11: Assigning coordinates to clusters

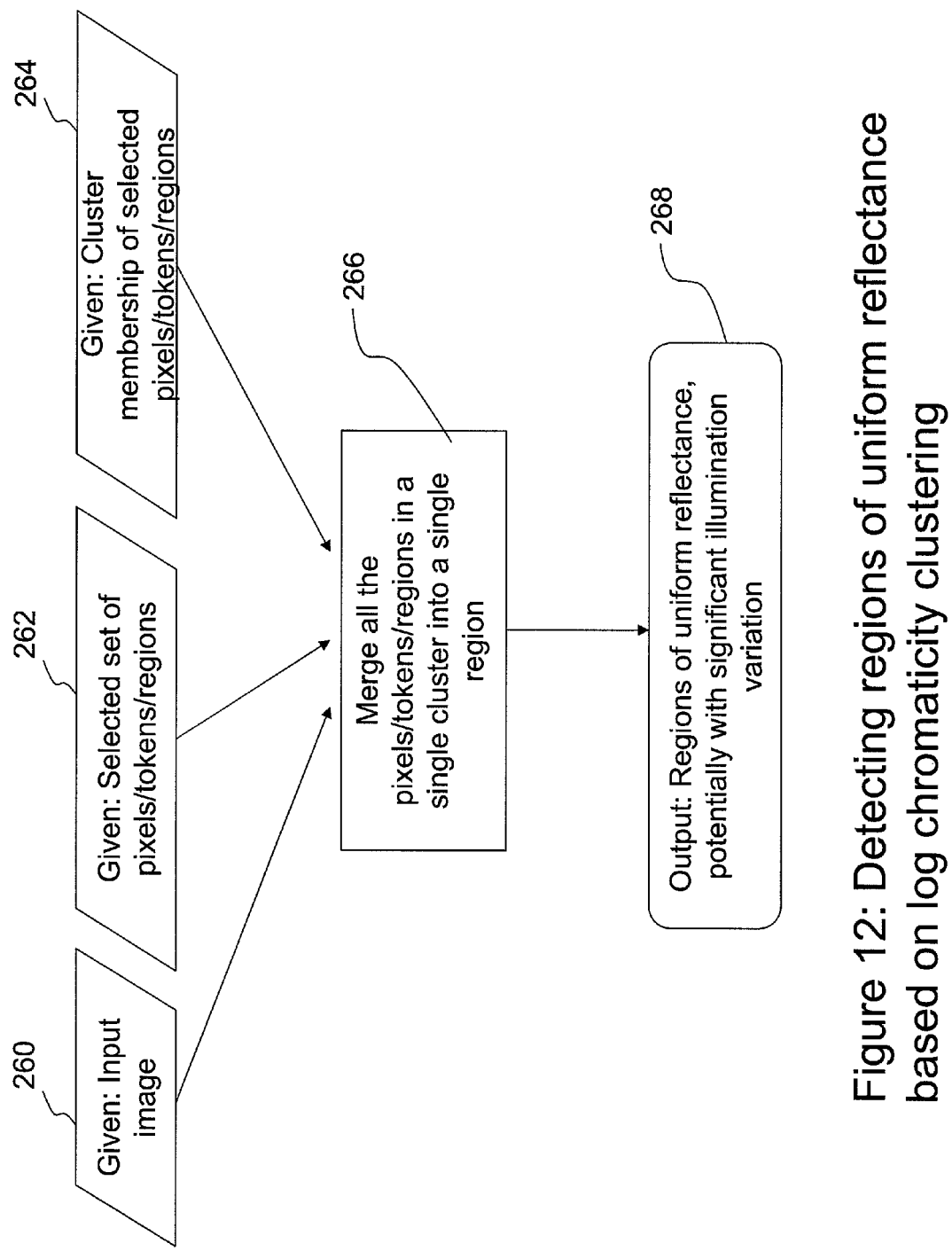
Figure 12: Detecting regions of uniform reflectance based on log chromaticity clustering Figure 18: Representation of Body Reflection in RGB Space

AUTOMATIC PROCESSING SCALE ESTIMATION FOR USE IN AN IMAGE PROCESS

BACKGROUND OF THE INVENTION

Many significant and commercially important uses of modern computer technology relate to images. These include image processing, image analysis and computer vision applications. In computer vision applications, such as, for example, object recognition and optical character recognition, it has been found that a separation of illumination and material aspects of an image can significantly improve the accuracy of computer performance. Significant pioneer inventions related to the illumination and material aspects of an image are disclosed in U.S. Pat. No. 7,873,219 to Richard Mark Friedhoff, entitled Differentiation Of Illumination And Reflection Boundaries and U.S. Pat. No. 7,672,530 to Richard Mark Friedhoff et al., entitled Method And System For Identifying Illumination Flux In An Image (hereinafter the Friedhoff Patents).

SUMMARY OF THE INVENTION

The present invention provides an improvement and enhancement to the fundamental teachings of the Friedhoff Patents, and includes a method and system comprising image techniques that accurately and correctly generate intrinsic images, including an automatic estimation of a processing scale for use in image processing techniques.

In a first exemplary embodiment of the present invention, an automated, computerized method is provided for processing an image. According to a feature of the present invention, the method comprises the steps of providing an image file depicting an image, in a computer memory, calculating processing scale parameter information as a function of width dimension information for penumbrae depicted in the image; and generating intrinsic illumination and material reflectance images corresponding to the image using the processing scale parameter information.

In a second exemplary embodiment of the present invention, a computer program product, disposed on a computer readable media is provided. The computer program product includes computer executable process steps operable to control a computer to: provide an image file depicting an image, in a computer memory, calculate processing scale parameter information as a function of width dimension information for penumbrae depicted in the image, and generate intrinsic illumination and material reflectance images corresponding to the image using the processing scale parameter information.

In accordance with yet further embodiments of the present invention, computer systems are provided, which include one or more computers configured (e.g., programmed) to perform the methods described above. In accordance with other embodiments of the present invention, non-transitory computer readable media are provided which have stored thereon computer executable process steps operable to control a computer(s) to implement the embodiments described above. The present invention contemplates a computer readable media as any product that embodies information usable in a computer to execute the methods of the present invention, including instructions implemented as a hardware circuit, for example, as in an integrated circuit chip. The automated, computerized methods can be performed by a digital computer, analog computer, optical sensor, state machine, sequencer, integrated chip or any device or apparatus that can be designed or programmed to carry out the steps of the methods of the present invention.

BRIEF DESCRIPTION OF THE DRAWINGS

FIG. 2 shows an n×m pixel array image file for an image stored in the computer system of FIG. 1.

FIG. 3a is a flow chart for identifying Type C token regions in the image file of FIG. 2, according to a feature of the present invention.

FIG. 3b is an original image used as an example in the identification of Type C tokens.

FIG. 3c shows Type C token regions in the image of FIG. 3b.

FIG. 3d shows Type B tokens, generated from the Type C tokens of FIG. 3c, according to a feature of the present invention.

FIG. 5 is a graphic representation of a log color space chromaticity plane according to a feature of the present invention.

FIG. 6 is a flow chart for determining a list of colors depicted in an input image.

FIG. 7 is a flow chart for determining an orientation for a log chromaticity space.

FIG. 8 is a flow chart for determining log chromaticity coordinates for the colors of an input image, as determined through execution of the routine of FIG. 6.

FIG. 9 is a flow chart for augmenting the log chromaticity coordinates, as determined through execution of the routine of FIG. 8.

FIG. 10 is a flow chart for clustering the log chromaticity coordinates, according to a feature of the present invention.

FIG. 11 is a flow chart for assigning the log chromaticity coordinates to clusters determined through execution of the routine of FIG. 10.

FIG. 12 is a flow chart for detecting regions of uniform reflectance based on the log chromaticity clustering.

DETAILED DESCRIPTION OF THE PREFERRED EMBODIMENTS

Figure 1:
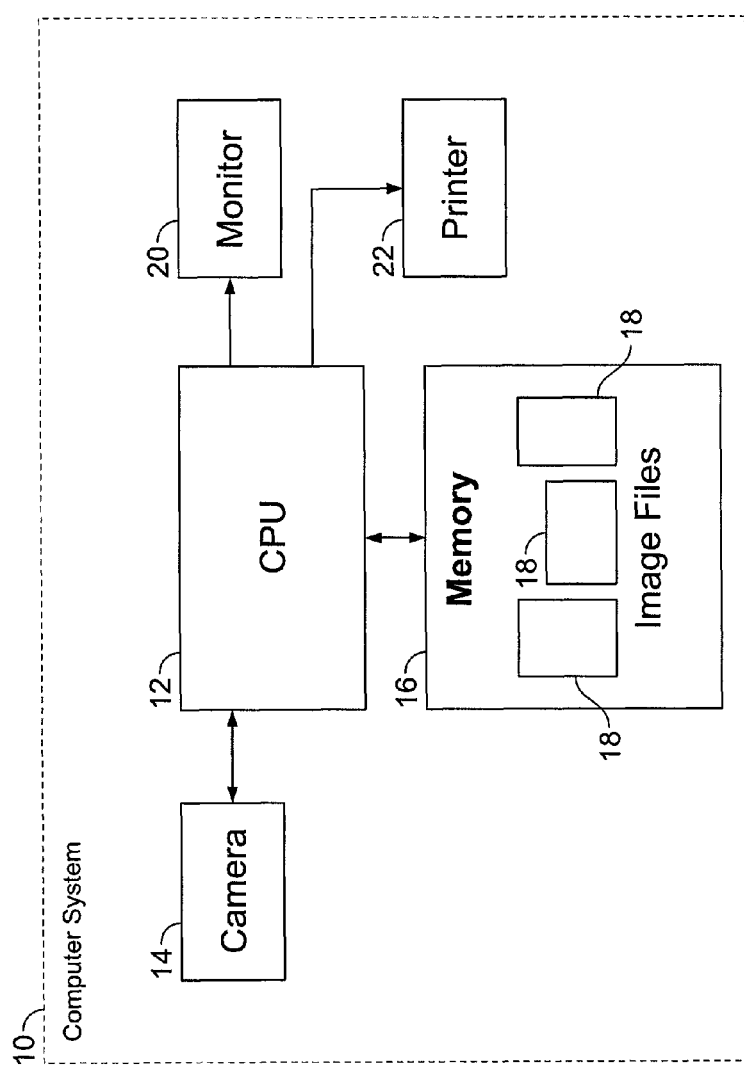
FIG. 1 is a block diagram of a computer system arranged and configured to perform operations related to images.

Referring now to the drawings, and initially to FIG. 1, there is shown a block diagram of a computer system 10 arranged and configured to perform operations related to images. A CPU 12 is coupled to a device such as, for example, a digital camera 14 via, for example, a USB port. The digital camera 14 operates to download images stored locally on the camera 14, to the CPU 12. The CPU 12 stores the downloaded images in a memory 16 as image files 18. The image files 18 can be accessed by the CPU 12 for display on a monitor 20, or for print out on a printer 22.

Alternatively, the CPU 12 can be implemented as a microprocessor embedded in a device such as, for example, the digital camera 14 or a robot. The CPU 12 can also be equipped with a real time operating system for real time operations related to images, in connection with, for example, a robotic operation or an interactive operation with a user.

As shown in FIG. 2, each image file 18 comprises an n×m pixel array. Each pixel, p, is a picture element corresponding to a discrete portion of the overall image. All of the pixels together define the image represented by the image file 18. Each pixel comprises a digital value corresponding to a set of color bands, for example, red, green and blue color components (RGB) of the picture element. The present invention is applicable to any multi-band image, where each band corresponds to a piece of the electro-magnetic spectrum. The pixel array includes n rows of m columns each, starting with the pixel p(1,1) and ending with the pixel p(n, m). When displaying or printing an image, the CPU 12 retrieves the corresponding image file 18 from the memory 16, and operates the monitor 20 or printer 22, as the case may be, as a function of the digital values of the pixels in the image file 18, as is generally known.

In an image operation, the CPU 12 operates to analyze the RGB values of the pixels of a stored image file 18 to achieve various objectives, such as, for example, to identify regions of an image that correspond to a single material depicted in a scene recorded in the image file 18. A fundamental observation underlying a basic discovery of the present invention, is that an image comprises two components, material and illumination. All changes in an image are caused by one or the other of these components. A method for detecting of one of these components, for example, material, provides a mechanism for distinguishing material or object geometry, such as object edges, from illumination and shadow boundaries.

Such a mechanism enables techniques that can be used to generate intrinsic images. The intrinsic images correspond to an original image, for example, an image depicted in an input image file 18. The intrinsic images include, for example, an illumination image, to capture the intensity and color of light incident upon each point on the surfaces depicted in the image, and a material reflectance image, to capture reflectance properties of surfaces depicted in the image (the percentage of each wavelength of light a surface reflects). The separation of illumination from material in the intrinsic images provides the CPU 12 with images optimized for more effective and accurate further processing.

Pursuant to a feature of the present invention, processing is performed at a token level. A token is a connected region of an image wherein the pixels of the region are related to one another in a manner relevant to identification of image features and characteristics such as an identification of materials and illumination. The pixels of a token can be related in terms of either homogeneous factors, such as, for example, close correlation of color among the pixels, or inhomogeneous factors, such as, for example, differing color values related geometrically in a color space such as RGB space, commonly referred to as a texture. The present invention utilizes spatio-spectral information relevant to contiguous pixels of an image depicted in an image file 18 to identify token regions. The spatio-spectral information includes spectral relationships among contiguous pixels, in terms of color bands, for example the RGB values of the pixels, and the spatial extent of the pixel spectral characteristics relevant to a single material.

According to one exemplary embodiment of the present invention, tokens are each classified as either a Type A token, a Type B token or a Type C token. A Type A token is a connected image region comprising contiguous pixels that represent the largest possible region of the image encompassing a single material in the scene (uniform reflectance). A Type B token is a connected image region comprising contiguous pixels that represent a region of the image encompassing a single material in the scene, though not necessarily the maximal region of uniform reflectance corresponding to that material. A Type B token can also be defined as a collection of one or more image regions or pixels, all of which have the same reflectance (material color) though not necessarily all pixels which correspond to that material color. A Type C token comprises a connected image region of similar image properties among the contiguous pixels of the token, where similarity is defined with respect to a noise model for the imaging system used to record the image.

Referring now to FIG. 3a, there is shown a flow chart for identifying Type C token regions in the scene depicted in the image file 18 of FIG. 2, according to a feature of the present invention. Type C tokens can be readily identified in an image, utilizing the steps of FIG. 3a, and then analyzed and processed to construct Type B tokens, according to a feature of the present invention.

A $1^{st}$ order uniform, homogeneous Type C token comprises a single robust color measurement among contiguous pixels of the image. At the start of the identification routine, the CPU 12 sets up a region map in memory. In step 100, the CPU 12 clears the region map and assigns a region ID, which is initially set at 1. An iteration for the routine, corresponding to a pixel number, is set at i=0, and a number for an N×N pixel array, for use as a seed to determine the token, is set an initial value, N=$N_{start}$. $N_{start}$ can be any integer >0, for example it can be set at set at 11 or 15 pixels.

At step 102, a seed test is begun. The CPU 12 selects a first pixel, i=1, pixel (1, 1) for example (see FIG. 2), the pixel at the upper left corner of a first N×N sample of the image file 18. The pixel is then tested in decision block 104 to determine if the selected pixel is part of a good seed. The test can comprise a comparison of the color value of the selected pixel to the color values of a preselected number of its neighboring pixels as the seed, for example, the N×N array. The color values comparison can be with respect to multiple color band values (RGB in our example) of the pixel. If the comparison does not result in approximately equal values (within the noise levels of the recording device) for the pixels in the seed, the CPU 12 increments the value of i (step 106), for example, i=2, pixel (1, 2), for a next N×N seed sample, and then tests to determine if i=$i_{max}$ (decision block 108).

If the pixel value is at $i_{max}$, a value selected as a threshold for deciding to reduce the seed size for improved results, the seed size, N, is reduced (step 110), for example, from N=15 to N=12. In an exemplary embodiment of the present invention, $i_{max}$ can be set at a number of pixels in an image ending at pixel (n, m), as shown in FIG. 2. In this manner, the routine of FIG. 3a parses the entire image at a first value of N before repeating the routine for a reduced value of N.

After reduction of the seed size, the routine returns to step 102, and continues to test for token seeds. An $N_{stop}$ value (for example, N=2) is also checked in step 110 to determine if the analysis is complete. If the value of N is at $N_{stop}$, the CPU 12 has completed a survey of the image pixel arrays and exits the routine.

If the value of i is less than $i_{max}$, and N is greater than $N_{stop}$, the routine returns to step 102, and continues to test for token seeds.

When a good seed (an N×N array with approximately equal pixel values) is found (block 104), the token is grown from the seed. In step 112, the CPU 12 pushes the pixels from the seed onto a queue. All of the pixels in the queue are marked with the current region ID in the region map. The CPU 12 then inquires as to whether the queue is empty (decision block 114). If the queue is not empty, the routine proceeds to step 116.

In step 116, the CPU 12 pops the front pixel off the queue and proceeds to step 118. In step 118, the CPU 12 marks "good' neighbors around the subject pixel, that is neighbors approximately equal in color value to the subject pixel, with the current region ID. All of the marked good neighbors are placed in the region map and also pushed onto the queue. The CPU 12 then returns to the decision block 114. The routine of steps 114, 116, 118 is repeated until the queue is empty. At that time, all of the pixels forming a token in the current region will have been identified and marked in the region map as a Type C token.

When the queue is empty, the CPU 12 proceeds to step 120. At step 120, the CPU 12 increments the region ID for use with identification of a next token. The CPU 12 then returns to step 106 to repeat the routine in respect of the new current token region.

Upon arrival at N=$N_{stop}$, step 110 of the flow chart of FIG. 3a, or completion of a region map that coincides with the image, the routine will have completed the token building task. FIG. 3b is an original image used as an example in the identification of tokens. The image shows areas of the color blue and the blue in shadow, and of the color teal and the teal in shadow. FIG. 3c shows token regions corresponding to the region map, for example, as identified through execution of the routine of FIG. 3a (Type C tokens), in respect to the image of FIG. 3b. The token regions are color coded to illustrate the token makeup of the image of FIG. 3b, including penumbra regions between the full color blue and teal areas of the image and the shadow of the colored areas.

While each Type C token comprises a region of the image having a single robust color measurement among contiguous pixels of the image, the token may grow across material boundaries. Typically, different materials connect together in one Type C token via a neck region often located on shadow boundaries or in areas with varying illumination crossing different materials with similar hue but different intensities. A neck pixel can be identified by examining characteristics of adjacent pixels. When a pixel has two contiguous pixels on opposite sides that are not within the corresponding token, and two contiguous pixels on opposite sides that are within the corresponding token, the pixel is defined as a neck pixel.

Figure 4:
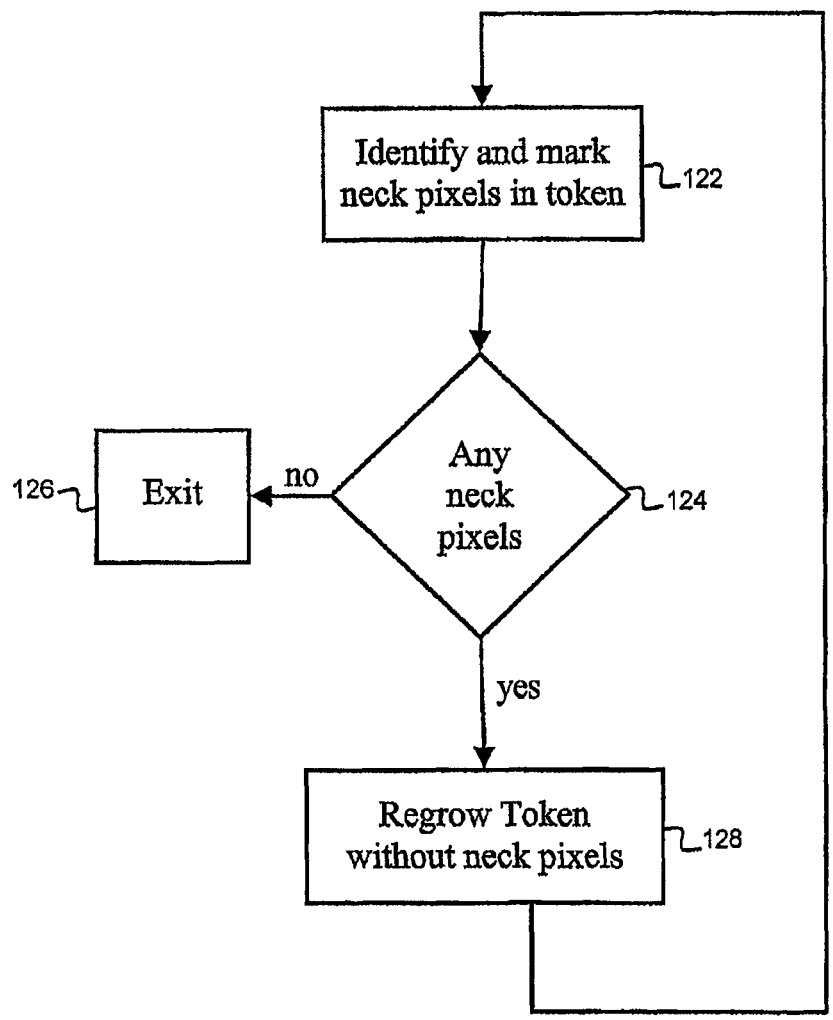
FIG. 4 is a flow chart for a routine to test Type C tokens identified by the routine of the flow chart of FIG. 3a, according to a feature of the present invention.

FIG. 4 shows a flow chart for a neck test for Type C tokens. In step 122, the CPU 12 examines each pixel of an identified token to determine whether any of the pixels under examination forms a neck. The routine of FIG. 4 can be executed as a subroutine directly after a particular token is identified during execution of the routine of FIG. 3a. All pixels identified as a neck are marked as "ungrowable." In decision block 124, the CPU 12 determines if any of the pixels were marked.

If no, the CPU 12 exits the routine of FIG. 4 and returns to the routine of FIG. 3a (step 126).

If yes, the CPU 12 proceeds to step 128 and operates to regrow the token from a seed location selected from among the unmarked pixels of the current token, as per the routine of FIG. 3a, without changing the counts for seed size and region ID. During the regrowth process, the CPU 12 does not include any pixel previously marked as ungrowable. After the token is regrown, the previously marked pixels are unmarked so that other tokens may grow into them.

Subsequent to the regrowth of the token without the previously marked pixels, the CPU 12 returns to step 122 to test the newly regrown token. Neck testing identifies Type C tokens that cross material boundaries, and regrows the identified tokens to provide single material Type C tokens suitable for use in creating Type B tokens.

FIG. 3d shows Type B tokens generated from the Type C tokens of FIG. 3c, according to a feature of the present invention. The present invention provides a novel exemplary technique using log chromaticity clustering, for constructing Type B tokens for an image file 18. Log chromaticity is a technique for developing an illumination invariant chromaticity space.

A method and system for separating illumination and reflectance using a log chromaticity representation is disclosed in U.S. Pat. No. 7,596,266, which is hereby expressly incorporated by reference. The techniques taught in U.S. Pat. No. 7,596,266 can be used to provide illumination invariant log chromaticity representation values for each color of an image, for example, as represented by Type C tokens. Logarithmic values of the color band values of the image pixels are plotted on a log-color space graph. The logarithmic values are then projected to a log-chromaticity projection plane oriented as a function of a bi-illuminant dichromatic reflection model (BIDR model), to provide a log chromaticity value for each pixel, as taught in U.S. Pat. No. 7,596,266. The BIDR Model predicts that differing color measurement values fall within a cylinder in RGB space, from a dark end (in shadow) to a bright end (lit end), along a positive slope, when the color change is due to an illumination change forming a shadow over a single material of a scene depicted in the image.

FIG. 5 is a graphic representation of a log color space, bi-illuminant chromaticity plane according to a feature of the invention disclosed in U.S. Pat. No. 7,596,266. The alignment of the chromaticity plane is determined by a vector N, normal to the chromaticity plane, and defined as N= $\log(Bright_{vector})-\log(Dark_{vector})=\log(1+1/S_{vector})$. The co-ordinates of the plane, u, v can be defined by a projection of the green axis onto the chromaticity plane as the u axis, and the cross product of u and N being defined as the v axis. In our example, each log value for the materials A, B, C is projected onto the chromaticity plane, and will therefore have a corresponding u, v co-ordinate value in the plane that is a chromaticity value, as shown in FIG. 5.

Thus, according to the technique disclosed in U.S. Pat. No. 7,596,266, the RGB values of each pixel in an image file 18 can be mapped by the CPU 12 from the image file value p(n, m, R, G, B) to a log value, then, through a projection to the chromaticity plane, to the corresponding u, v value, as shown in FIG. 5. Each pixel p(n, m, R, G, B) in the image file 18 is then replaced by the CPU 12 by a two dimensional chromaticity value: p(n, m, u, v), to provide a chromaticity representation of the original RGB image. In general, for an N band image, the N color values are replaced by N−1 chromaticity values. The chromaticity representation is a truly accurate illumination invariant representation because the BIDR model upon which the representation is based, accurately and correctly represents the illumination flux that caused the original image.

According to the invention disclosed and claimed in related application Ser. No. 12/927,244, filed Nov. 10, 2010, entitled System and Method for Identifying Complex Tokens in an Image (expressly incorporated by reference herein and hereinafter referred to as "related invention"), log chromaticity values are calculated for each color depicted in an image file 18 input to the CPU 12 for identification of regions of the uniform reflectance (Type B tokens). For example, each pixel of a Type C token will be of approximately the same color value, for example, in terms of RGB values, as all the other constituent pixels of the same Type C token, within the noise level of the equipment used to record the image. Thus, an average of the color values for the constituent pixels of each particular Type C token can be used to represent the color value for the respective Type C token in the log chromaticity analysis.

FIG. 6 is a flow chart for determining a list of colors depicted in an input image, for example, an image file 18. In step 200, an input image file 18 is input to the CPU 12 for processing. In steps 202 and 204, the CPU 12 determines the colors depicted in the input image file 18. In step 202, the CPU 12 calculates an average color for each Type C token determined by the CPU 12 through execution of the routine of FIG. 3a, as described above, for a list of colors. The CPU 12 can be operated to optionally require a minimum token size, in terms of the number of constituent pixels of the token, or a minimum seed size (the N×N array) used to determine Type C tokens according to the routine of FIG. 3a, for the analysis. The minimum size requirements are implemented to assure that color measurements in the list of colors for the image are an accurate depiction of color in a scene depicted in the input image, and not an artifact of blend pixels.

Blend pixels are pixels between two differently colored regions of an image. If the colors between the two regions are plotted in RGB space, there is a linear transition between the colors, with each blend pixel, moving from one region to the next, being a weighted average of the colors of the two regions. Thus, each blend pixel does not represent a true color of the image. If blend pixels are present, relatively small Type C tokens, consisting of blend pixels, can be identified for areas of an image between two differently colored regions. By requiring a size minimum, the CPU 12 can eliminate tokens consisting of blend pixel from the analysis.

In step 204, the CPU 12 can alternatively collect colors at the pixel level, that is, the RGB values of the pixels of the input image file 18, as shown in FIG. 2. The CPU 12 can be operated to optionally require each pixel of the image file 18 used in the analysis to have a minimum stability or local standard deviation via a filter output, for a more accurate list of colors. For example, second derivative energy can be used to indicate the stability of pixels of an image.

In this approach, the CPU 12 calculates a second derivative at each pixel, or a subset of pixels disbursed across the image to cover all illumination conditions of the image depicted in an input image file 18, using a Difference of Gaussians, Laplacian of Gaussian, or similar filter. The second derivative energy for each pixel examined can then be calculated by the CPU 12 as the average of the absolute value of the second derivative in each color band (or the absolute value of the single value in a grayscale image), the sum of squares of the values of the second derivatives in each color band (or the square of the single value in a grayscale image), the maximum squared second derivative value across the color bands (or the square of the single value in a grayscale image), or any similar method. Upon the calculation of the second derivative energy for each of the pixels, the CPU 12 analyzes the energy values of the pixels. There is an inverse relationship between second derivative energy and pixel stability, the higher the energy, the less stable the corresponding pixel.

In step 206, the CPU 12 outputs a list or lists of color (after executing one or both of steps 202 and/or 204). According to a feature of the related invention, all of the further processing can be executed using the list from either step 202 or 204, or vary the list used (one or the other of the lists from steps 202 or 204) at each subsequent step.

FIG. 7 is a flow chart for determining an orientation for a log chromaticity representation, according to a feature of the related invention. For example, the CPU 12 determines an orientation for the normal N, for a log chromaticity plane, as shown in FIG. 5. In step 210, the CPU 12 receives a list of colors for an input file 18, such as a list output in step 206 of the routine of FIG. 6. In step 212, the CPU 12 determines an orientation for a log chromaticity space.

As taught in U.S. Pat. No. 7,596,266, and as noted above, orientation of the chromaticity plane is represented by N, N being a vector normal to the chromaticity representation, for example, the chromaticity plane of FIG. 5. The orientation is estimated by the CPU 12 thorough execution of any one of several techniques. For example, the CPU 12 can determine estimates based upon entropy minimization, manual selection of lit/shadowed regions of a same material by a user or the use of a characteristic spectral ratio (which corresponds to the orientation N) for an image of an input image file 18, as fully disclosed in U.S. Pat. No. 7,596,266.

For a higher dimensional set of colors, for example, an RYGB space (red, yellow, green, blue), the log chromaticity normal, N, defines a sub-space with one less dimension than the input space. Thus, in the four dimensional RYGB space, the normal N defines a three dimensional log chromaticity space. When the four dimensional RYGB values are projected into the three dimensional log chromaticity space, the projected values within the log chromaticity space are unaffected by illumination variation.

In step 214, the CPU 12 outputs an orientation for the normal N. As illustrated in the example of FIG. 5, the normal N defines an orientation for a u, v plane in a three dimensional RGB space.

FIG. 8 is a flow chart for determining log chromaticity coordinates for the colors of an input image, as identified in steps 202 or 204 of the routine of FIG. 6. In step 220, a list of colors is input to the CPU 12. The list of colors can comprise either the list generated through execution of step 202 of the routine of FIG. 6, or the list generated through execution of step 204. In step 222, the log chromaticity orientation for the normal, N, determined through execution of the routine of FIG. 7, is also input to the CPU 12.

In step 224, the CPU 12 operates to calculate a log value for each color in the list of colors and plots the log values in a three dimensional log space at respective (log R, log G, log B) coordinates, as illustrated in FIG. 5. Materials A, B and C denote log values for specific colors from the list of colors input to the CPU 12 in step 220. A log chromaticity plane is also calculated by the CPU 12, in the three dimensional log space, with u, v coordinates and an orientation set by N, input to the CPU 12 in step 222. Each u, v coordinate in the log chromaticity plane can also be designated by a corresponding (log R, log G, log B) coordinate in the three dimensional log space.

According to a feature of the related invention, the CPU 12 then projects the log values for the colors A, B and C onto the log chromaticity plane to determine a u, v log chromaticity coordinate for each color. Each u, v log chromaticity coordinate can be expressed by the corresponding (log R, log G, log B) coordinate in the three dimensional log space. The CPU 12 outputs a list of the log chromaticity coordinates in step 226. The list cross-references each color to a u, v log chromaticity coordinate and to the pixels (or a Type C tokens) having the respective color (depending upon the list of colors used in the analysis (either step 202(tokens) or 204 (pixels))).

FIG. 9 is a flow chart for optionally augmenting the log chromaticity coordinates for pixels or Type C tokens with extra dimensions, according to a feature of the related invention. In step 230, the list of log chromaticity coordinates, determined for the colors of the input image through execution of the routine of FIG. 8, is input to the CPU 12. In step 232, the CPU 12 accesses the input image file 18, for use in the augmentation.

In step 234, the CPU 12 optionally operates to augment each log chromaticity coordinate with a tone mapping intensity for each corresponding pixel (or Type C token). The tone mapping intensity is determined using any known tone mapping technique. An augmentation with tone mapping intensity information provides a basis for clustering pixels or tokens that are grouped according to both similar log chromaticity coordinates and similar tone mapping intensities. This improves the accuracy of a clustering step.

In step 236, the CPU 12 optionally operates to augment each log chromaticity coordinate with x, y coordinates for the corresponding pixel (or an average of the x, y coordinates for the constituent pixels of a Type C token) (see FIG. 2 showing a P (1,1) to P (N, M) pixel arrangement). Thus, a clustering step with x, y coordinate information will provide groups in a spatially limited arrangement, when that characteristic is desired.

In each of steps 234 and 236, the augmented information can, in each case, be weighted by a factor $w_1$ and $w_2$, $w_3$ respectively, to specify the relative importance and scale of the different dimensions in the augmented coordinates. The weight factors $w_1$ and $w_2$, $w_3$ are user-specified. Accordingly, the (log R, log G, log B) coordinates for a pixel or Type C token is augmented to (log R, log G, log B, $T^*w_1$, $x^*w_2$, $y^*w_3$) where T, x and y are the tone mapped intensity, the x coordinate and the y coordinate, respectively.

In step 238, the CPU 12 outputs a list of the augmented coordinates. The augmented log chromaticity coordinates provide accurate illumination invariant representations of the pixels, or for a specified regional arrangement of an input image, such as, for example, Type C tokens. According to a feature of the related invention and the present invention, the illumination invariant characteristic of the log chromaticity coordinates is relied upon as a basis to identify regions of an image of a single material or reflectance, such as, for example, Type B tokens.

FIG. 10 is a flow chart for clustering the log chromaticity coordinates, according to a feature of the present invention. In step 240, the list of augmented log chromaticity coordinates is input the CPU 12. In step 242, the CPU 12 operates to cluster the log chromaticity coordinates. According to the teachings of the related invention, the clustering step can be implemented via, for example, a known k-means clustering. Any known clustering technique can be used to cluster the log chromaticity coordinates to determine groups of similar log chromaticity coordinate values, according to the related invention. According to the teachings of each of the related invention and the present invention, the CPU 12 correlates each log chromaticity coordinate to the group to which the respective coordinate belongs.

According to a feature of the present invention, the clustering step 242 is implemented as a function of an index of the type used in database management, for example, a hash index, a spatial hash index, b-trees or any other known index commonly used in a database management system. By implementing the clustering step 242 as a function of an index, the number of comparisons required to identify a cluster group for each pixel or token of an image is minimized. Accordingly, the clustering step can be executed by the CPU 12 in a minimum amount of time, to expedite the entire image process.

Figure 10A:
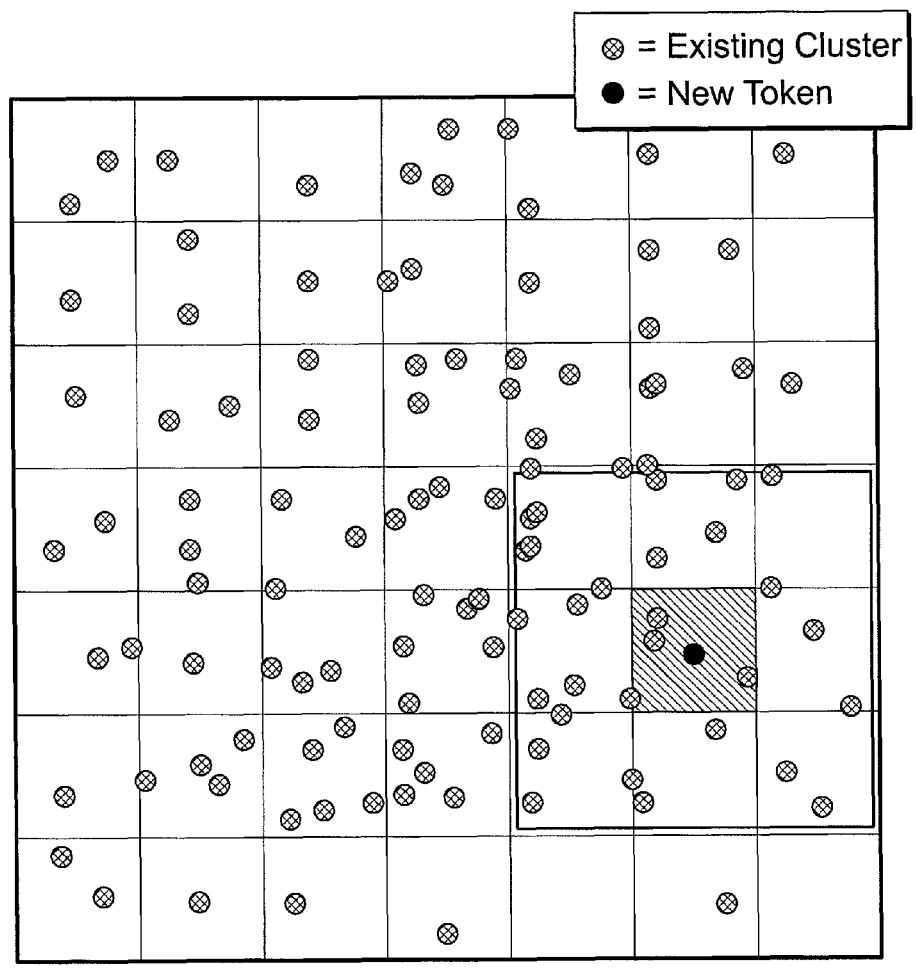
FIG. 10a is an illustration of a grid for a spatial hash, according to a feature of the present invention.

FIG. 10a is an illustration of a grid for a spatial hash, according to a feature of an exemplary embodiment of the present invention. As shown in FIG. 10a, a spatial hash divides an image being processed into a grid of buckets, each bucket being dimensioned to be spatialThresh×spatialThresh. The grid represents a histogram of the u,v log chromaticity values for the cluster groups. As each cluster is created, a reference to the cluster is placed in the appropriate bucket of the grid.

Each new pixel or token of the image being processed is placed in the grid, in the bucket it would occupy, as if the item (pixel or token) was a new group in the clustering process. The pixel or token is then examined relative to the clusters in, for example, a 3×3 grid of buckets surrounding the bucket occupied by the item being examined. The item is added to the cluster group within the 3×3 gird, for example, if the item is within a threshold for a clusterMean.

The CPU 12 also operates to calculate a center for each group identified in the clustering step. For example, the CPU 12 can determine a center for each group relative to a (log R, log G, log B, log T) space.

In step 244, the CPU 12 outputs a list of the cluster group memberships for the log chromaticity coordinates (cross referenced to either the corresponding pixels or Type C tokens) and/or a list of cluster group centers.

Pursuant to a further feature of the present invention, the list of cluster group memberships can be augmented with a user input of image characteristics. For example, a user can specify pixels or regions of the image that are of the same material reflectance. The CPU 12 operates to overlay the user specified pixels or regions of same reflectance onto the clustering group membership information.

As noted above, in the execution of the clustering method, the CPU 12 can use the list of colors from either the list generated through execution of step 202 of the routine of FIG. 6, or the list generated through execution of step 204. In applying the identified cluster groups to an input image, the CPU 12 can be operated to use the same set of colors as used in the clustering method (one of the list of colors corresponding to step 202 or to the list of colors corresponding to step 204), or apply a different set of colors (the other of the list of colors corresponding to step 202 or the list of colors corresponding to step 204). If a different set of colors is used, the CPU 12 proceeds to execute the routine of FIG. 11.

FIG. 11 is a flow chart for assigning the log chromaticity coordinates to clusters determined through execution of the routine of FIG. 10, when a different list of colors is used after the identification of the cluster groups, according to a feature of the present invention. In step 250, the CPU 12 once again executes the routine of FIG. 8, this time in respect to the new list of colors. For example, if the list of colors generated in step 202 (colors based upon Type C tokens) was used to identify the cluster groups, and the CPU 12 then operates to classify log chromaticity coordinates relative to cluster groups based upon the list of colors generated in step 204 (colors based upon pixels), step 250 of the routine of FIG. 11 is executed to determine the log chromaticity coordinates for the colors of the pixels in the input image file 18.

In step 252, the list of cluster centers is input to the CPU 12. In step 254, the CPU 12 operates to classify each of the log chromaticity coordinates identified in step 250, according to the nearest cluster group center. In step 256, the CPU 12 outputs a list of the cluster group memberships for the log chromaticity coordinates based upon the new list of colors, with a cross reference to either corresponding pixels or Type C tokens, depending upon the list of colors used in step 250 (the list of colors generated in step 202 or the list of colors generated in step 204).

FIG. 12 is a flow chart for detecting regions of uniform reflectance based on the log chromaticity clustering according to a feature of the present invention. In step 260, the input image file 18 is once again provided to the CPU 12. In step 262, one of the pixels or Type C tokens, depending upon the list of colors used in step 250, is input to the CPU 12. In step 264, the cluster membership information, form either steps 244 or 256, is input to the CPU 12.

In step 266, the CPU 12 operates to merge each of the pixels, or specified regions of an input image, such as, for example, Type C tokens, having a same cluster group membership into a single region of the image to represent a region of uniform reflectance (Type B token). The CPU 12 performs such a merge operation for all of the pixels or tokens, as the case may be, for the input image file 18. In step 268, the CPU 12 outputs a list of all regions of uniform reflectance (and also of similar tone mapping intensities and x, y coordinates, if the log chromaticity coordinates were augmented in steps 234 and/or 236). It should be noted that each region of uniform reflectance (Type B token) determined according to the features of the present invention, potentially has significant illumination variation across the region.

U.S. Pat. No. 8,139,867 teaches a constraint/solver model for segregating illumination and material in an image, including an optimized solution based upon a same material constraint. A same material constraint, as taught in U.S. Pat. No. 8,139,867, utilizes Type C tokens and Type B tokens, as can be determined according to the teachings of the present invention. The constraining relationship is that all Type C tokens that are part of the same Type B token are constrained to be of the same material. This constraint enforces the definition of a Type B token, that is, a connected image region comprising contiguous pixels that represent a region of the image encompassing a single material in the scene, though not necessarily the maximal region corresponding to that material. Thus, all Type C tokens that lie within the same Type B token are by the definition imposed upon Type B tokens, of the same material, though not necessarily of the same illumination. The Type C tokens are therefore constrained to correspond to observed differences in appearance that are caused by varying illumination.

Figure 13:
FIG. 13 is a representation of an [A][x]=[b] matrix relationship used to identify and separate illumination and material aspects of an image, according to a same-material constraint, for generation of intrinsic images.

FIG. 13 is a representation of an [A][x]=[b] matrix relationship used to identify and separate illumination and material aspects of an image, according to a same-material constraint, as taught in U.S. Pat. No. 8,139,867. Based upon the basic equation I=ML (I=the recorded image value, as stored in an image file 18, M=material reflectance, and L=illumination), $\log(I)=\log(ML)=\log(M)+\log(L)$. This can be restated as $i=m+l$, wherein i represents $\log(I)$, m represents $\log(M)$ and l represents $\log(L)$. In the constraining relationship of a same material, in an example where three Type C tokens, a, b and c, (as shown in FIG. 13) are within a region of single reflectance, as defined by a corresponding Type B token defined by a, b and c, then $m_a=m_b=m_c$. For the purpose of this example, the I value for each Type C token is the average color value for the recorded color values of the constituent pixels of the token. The a, b and c, Type C tokens of the example can correspond to the blue Type B token illustrated in FIG. 3d.

Since: $m_a=i_a-l_a$, $m_b=i_b-l_b$, and $m_c=i_c-l_c$, these mathematical relationships can be expressed, in a same material constraint, as $(1)l_a+(-1)l_b+(0)l_c=(i_a-i_b)$, $(1)l_a+(0)l_b+(-1)l_c=(i_a-i_c)$ and $(0)l_a+(1)l_b+(-1)l_c=(i_b-i_c)$.

Thus, in the matrix equation of FIG. 13, the various values for the log(I) ($i_a$, $i_b$, $i_c$), in the [b] matrix, are known from the average recorded pixel color values for the constituent pixels of the adjacent Type C tokens a, b and c. The [A] matrix of 0's, 1's and −1's, is defined by the set of equations expressing the same material constraint, as described above. The number of rows in the [A] matrix, from top to bottom, corresponds to the number of actual constraints imposed on the tokens, in this case three, the same material constraint between the three adjacent Type C tokens a, b and c. The number of columns in the [A] matrix, from left to right, corresponds to the number of unknowns to be solved for, again, in this case, the three illumination values for the three tokens. Therefore, the values for the illumination components of each Type C token a, b and c, in the [x] matrix, can be solved for in the matrix equation, by the CPU 12. It should be noted that each value is either a vector of three values corresponding to the color bands (such as red, green, and blue) of our example or can be a single value, such as in a grayscale image.

Once the illumination values are known, the material color can be calculated by the CPU 12 using the I=ML equation. Intrinsic illumination and material images can be now be generated for the region defined by tokens a, b and c, by replacing each pixel in the original image by the calculated illumination values and material values, respectively. An example of an illumination image and material image, corresponding to the original image shown in FIG. 3b, is illustrated in FIG. 14.

Implementation of the constraint/solver model according to the techniques and teachings of U.S. Pat. No. 8,139,867, utilizing the Type C tokens and Type B tokens obtained via a log chromaticity clustering technique according to the present invention, provides a highly effective and efficient method for generating intrinsic images corresponding to an original input image. The intrinsic images can be used to enhance the accuracy and efficiency of image processing, image analysis and computer vision applications.

However, the intrinsic images generated from the performance of the exemplary embodiments of the present invention can include artifacts that distort the appearance of a scene depicted in the image being processed. The artifacts can be introduced through execution of the intrinsic image generations methods of the present invention, or through user modifications such as the user input of image characteristics discussed above. Accordingly, according to a feature of the present invention, various post processing techniques can be implemented to reduce the artifacts.

Figure 14:
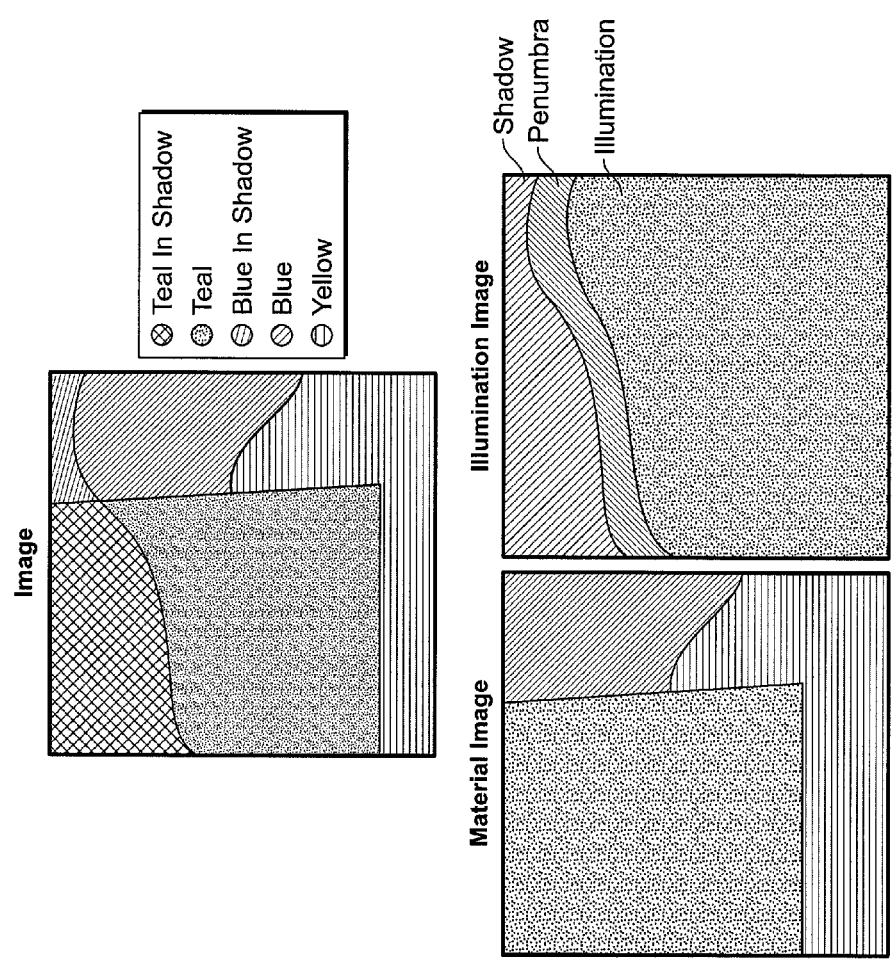
FIG. 14 illustrates intrinsic images including an illumination image and a material image corresponding to the original image of FIG. 3b.
Figure 15:
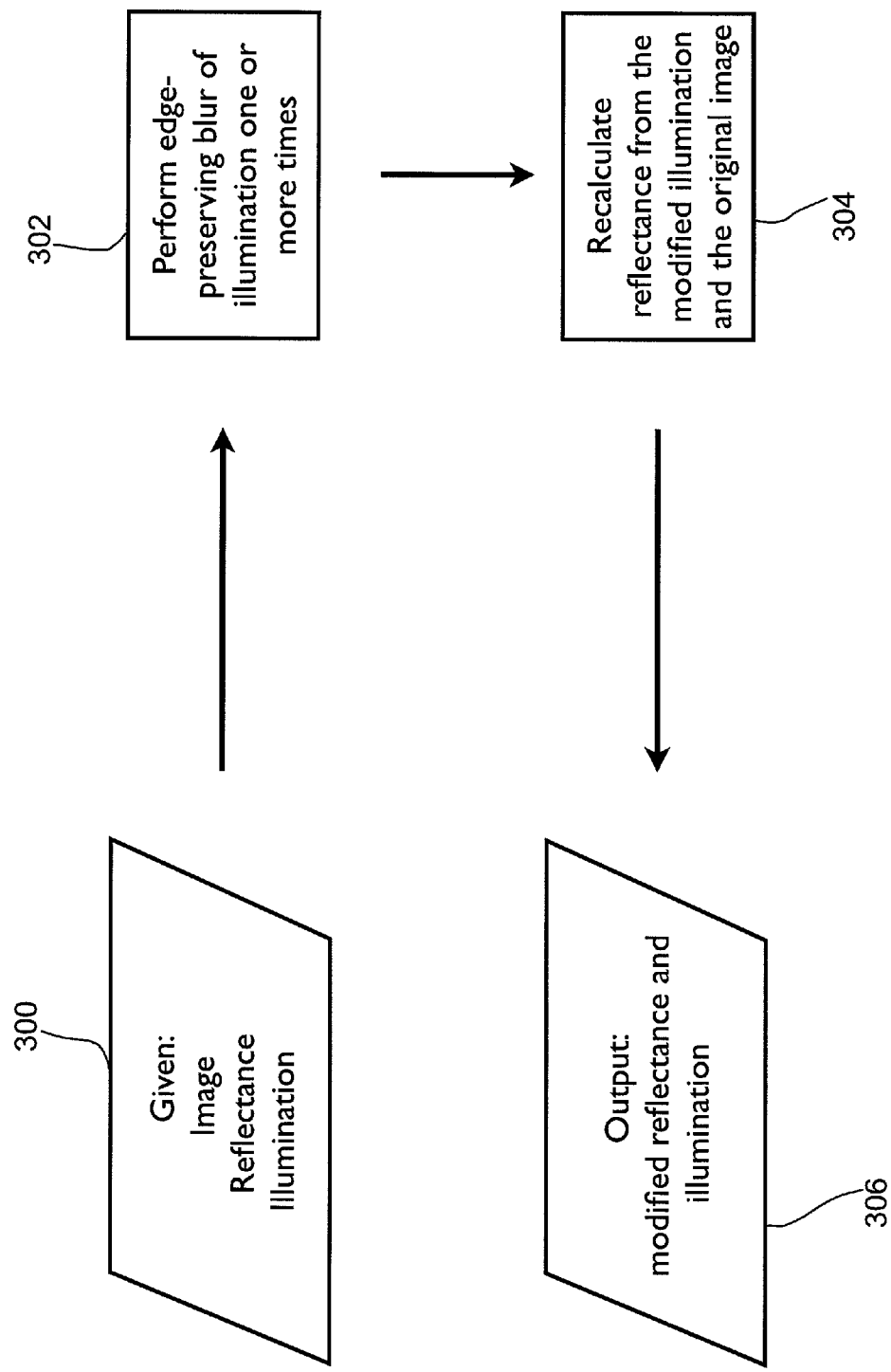
FIG. 15 is a flow chart for an edge preserving blur post processing technique applied to the intrinsic images illustrated in FIG. 14, according to a feature of the present invention.

FIG. 15 is a flow chart for an edge preserving blur post processing technique applied to the intrinsic images illustrated in FIG. 14, according to a feature of the present invention, to improve the quality of the illumination and material reflectance aspects depicted in the intrinsic images. In step 300, the CPU 12 receives as an input an original image (an image file 18), and the corresponding intrinsic material reflectance and illumination images determined by the CPU 12 through solution of the matrix equation shown in FIG. 13, as described above.

In step 302, the CPU 12 operates to perform an edge-preserving blur of the illumination in the illumination image by applying an edge preserving smoothing filter. The edge preserving smoothing filter can be any one of the known filters such as, for example, a bilateral filter, a guided filter, a mean-shift filter, a median filter, anisotropic diffusion and so on. The filter can be applied one or more times to the illumination image. In an exemplary embodiment, a bilateral filter is applied to the illumination image twice. In addition, several different types of filters can be applied in succession, for example, a median filter followed by a bilateral filter.

In step 304, the CPU 12 recalculates the intrinsic material reflectance image based upon the I=ML equation, and using the original image of the image file 18 and the illumination image, as modified in step 302. In step 306, the CPU 12 outputs intrinsic material reflectance and illumination images, as modified by the CPU 12 through execution of the routine of FIG. 15.

A smoothing filter applied to the illumination image results in several improvements to the appearance of the intrinsic images when used in, for example, such applications as computer graphics. For example, in computer graphics, texture mapping is used to achieve certain special effects. Artists consider it desirable in the performance of texture mapping to have some fine scale texture form the illumination in the material reflectance image. By smoothing the illumination image, in step 302, the fine scale texture is moved to the material reflectance image upon a recalculation of the material image in step 304, as will be described below.

In addition, smoothing the illumination in step 302 places some of the shading illumination (illumination intensity variation due to curvature of a surface) back into the material reflectance image, giving the material image some expression of curvature. That results in an improved material depiction more suitable for artistic rendering in a computer graphics application.

Moreover, small reflectance variation sometimes erroneously ends up in the illumination image. The smoothing in step 302 forces the reflectance variation back into the material image.

Figure 16:
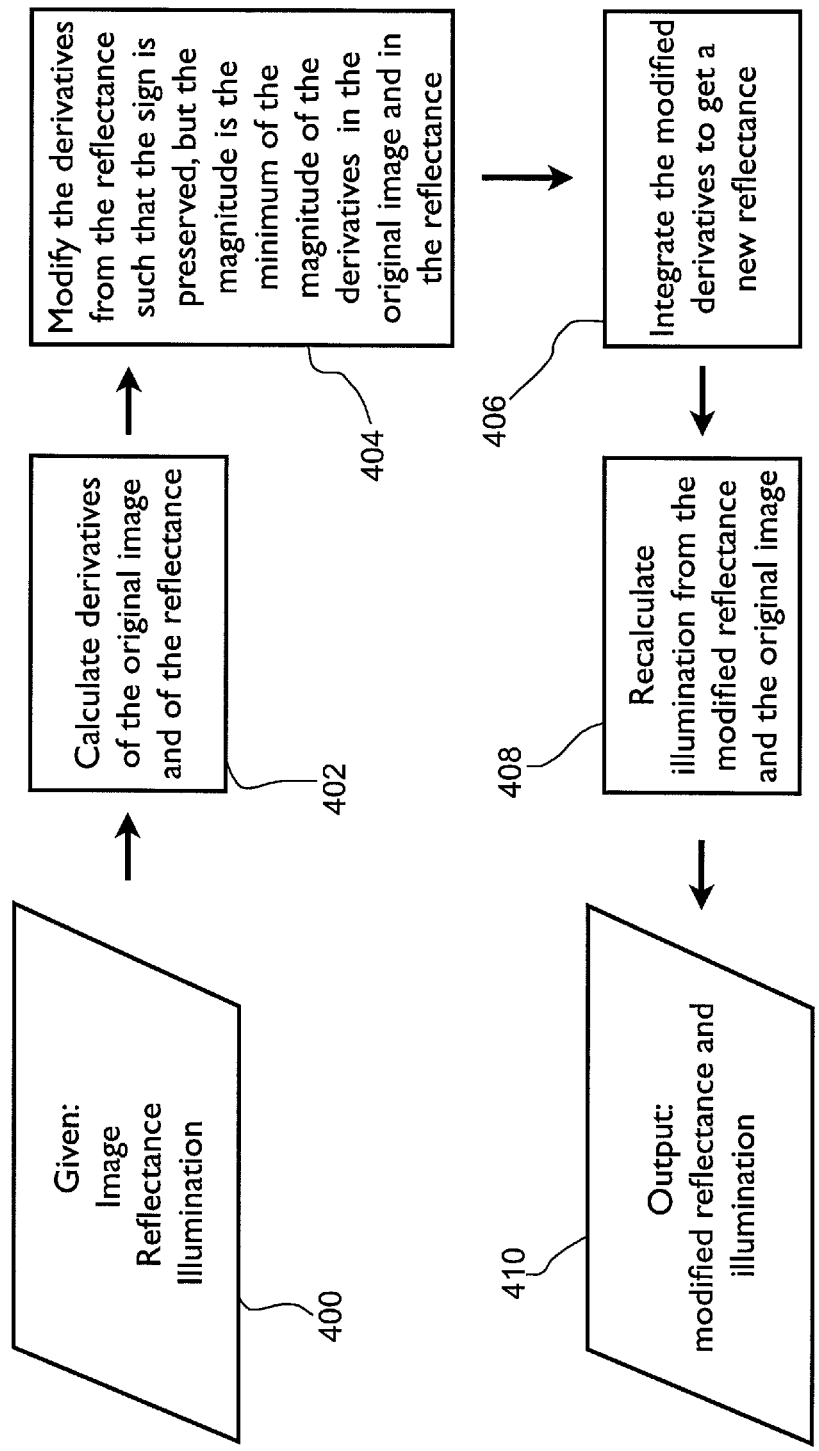
FIG. 16 is a flow chart for an artifact reduction post processing technique applied to the intrinsic images illustrated in FIG. 14, according to a feature of the present invention.

FIG. 16 is a flow chart for an artifact reduction post processing technique applied to the intrinsic images illustrated in FIG. 14, according to a feature of the present invention, to improve the quality of the illumination and material reflectance aspects depicted in the intrinsic images. In step 400, the CPU 12 receives as an input an original image (an image file 18), and the corresponding intrinsic material reflectance and illumination images determined by the CPU 12 through solution of the matrix equation shown in FIG. 13, as described above. Optionally, the intrinsic images can be previously modified by the CPU 12 through execution of the routine of FIG. 15.

In step 402, the CPU 12 operates to calculate derivatives (the differences between adjacent pixels) for the pixels of each of the original image and the material reflectance image. Variations between adjacent pixels, in the horizontal and vertical directions, are caused by varying illumination and different materials in the scene depicted in the original image. When the CPU 12 operates to factor the original image into intrinsic illumination and material reflectance images, some of the variation ends up in the illumination image and some ends up in the material reflectance image. Ideally, all of the variation in the illumination image is attributable to varying illumination, and all of the variation in the material reflectance image is attributable to different materials.

Thus, by removing the illumination variation, variations in the material reflectance image should be strictly less than variations in the original image. However, inaccuracies in the process for generating the intrinsic images can result in new edges appearing in the material reflectance image.

In step 404, the CPU 12 operates to identify the artifacts caused by the newly appearing edges by comparing the derivatives for the material reflectance image with the derivatives for the original image. The CPU 12 modifies the derivatives in the material reflectance image such that, for each derivative of the material reflectance image, the sign is preserved, but the magnitude is set at the minimum of the magnitude of the derivative in the original image and the material reflectance image. The modification can be expressed by the following equation:

$$\text{derivativeReflectanceNew} = \min(\text{abs}(\text{derivativeReflectanceOld}), \text{abs}(\text{derivativeOriginalimage})) * \text{sign}(\text{derivativeReflectanceOld})$$

In step 406, the CPU integrates the modified derivatives to calculate a new material reflectance image. The new image is a material reflectance image without the newly appearing, artifact-causing edges. Any known technique can be implemented to perform the integration. For example, the CPU 12 can operate to perform numerical 2D integration by solving the 2D Poisson equation using discrete cosine transforms.

In step 408, the CPU 12 recalculates the intrinsic illumination image based upon the I=ML equation, and using the original image of the image file 18 and the material reflectance image, as modified in steps 404 and 406. In step 408, the CPU 12 outputs intrinsic material reflectance and illumination images, as modified by the CPU 12 through execution of the routine of FIG. 16.

Figure 17:
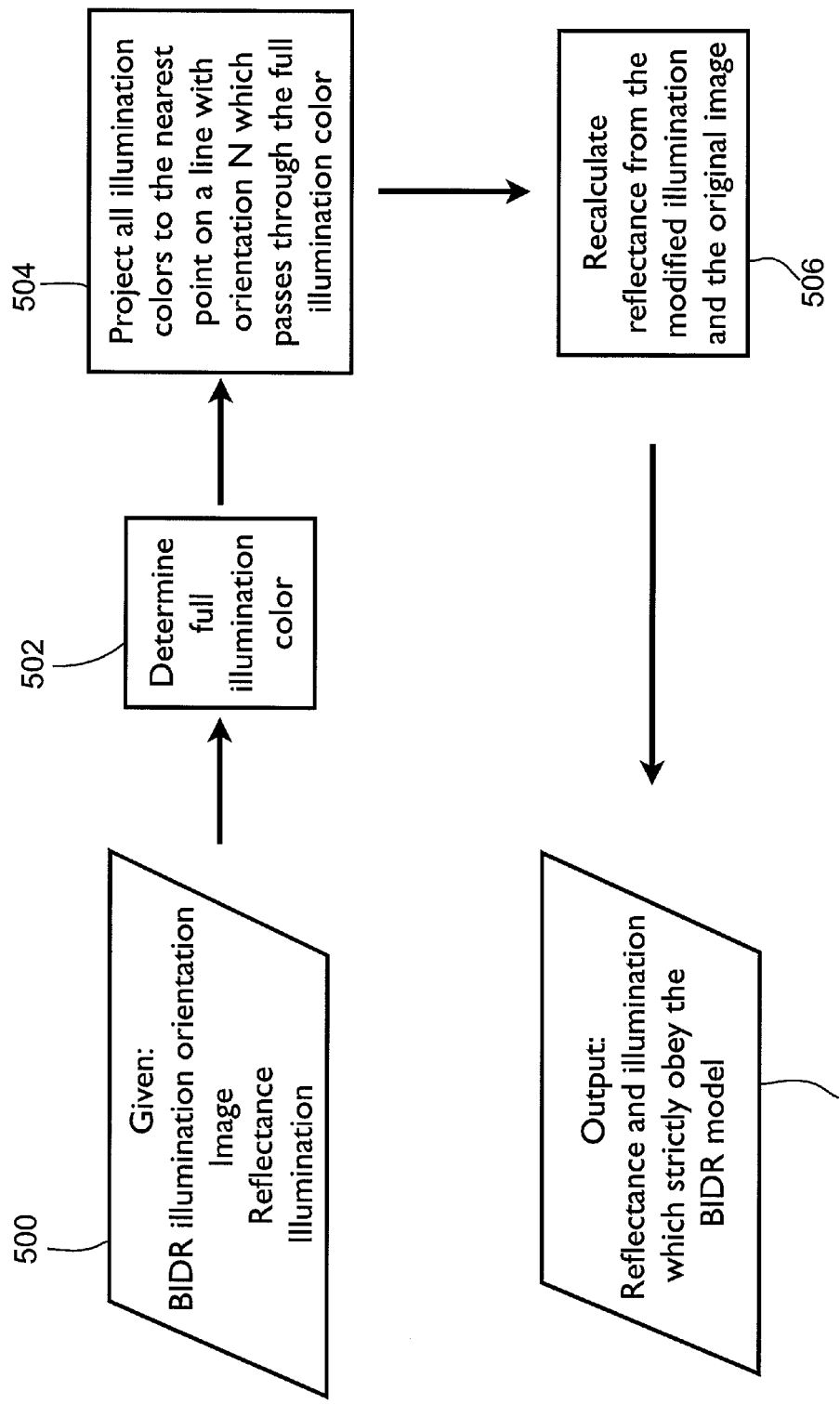
FIG. 17 is a flow chart for a BIDR model enforcement post processing technique applied to the intrinsic images illustrated in FIG. 14, according to a feature of the present invention.

FIG. 17 is a flow chart for a BIDR model enforcement post processing technique applied to the intrinsic images illustrated in FIG. 14, according to a feature of the present invention, to improve the quality of the illumination and material reflectance aspects depicted in the intrinsic images.

Figure 18:
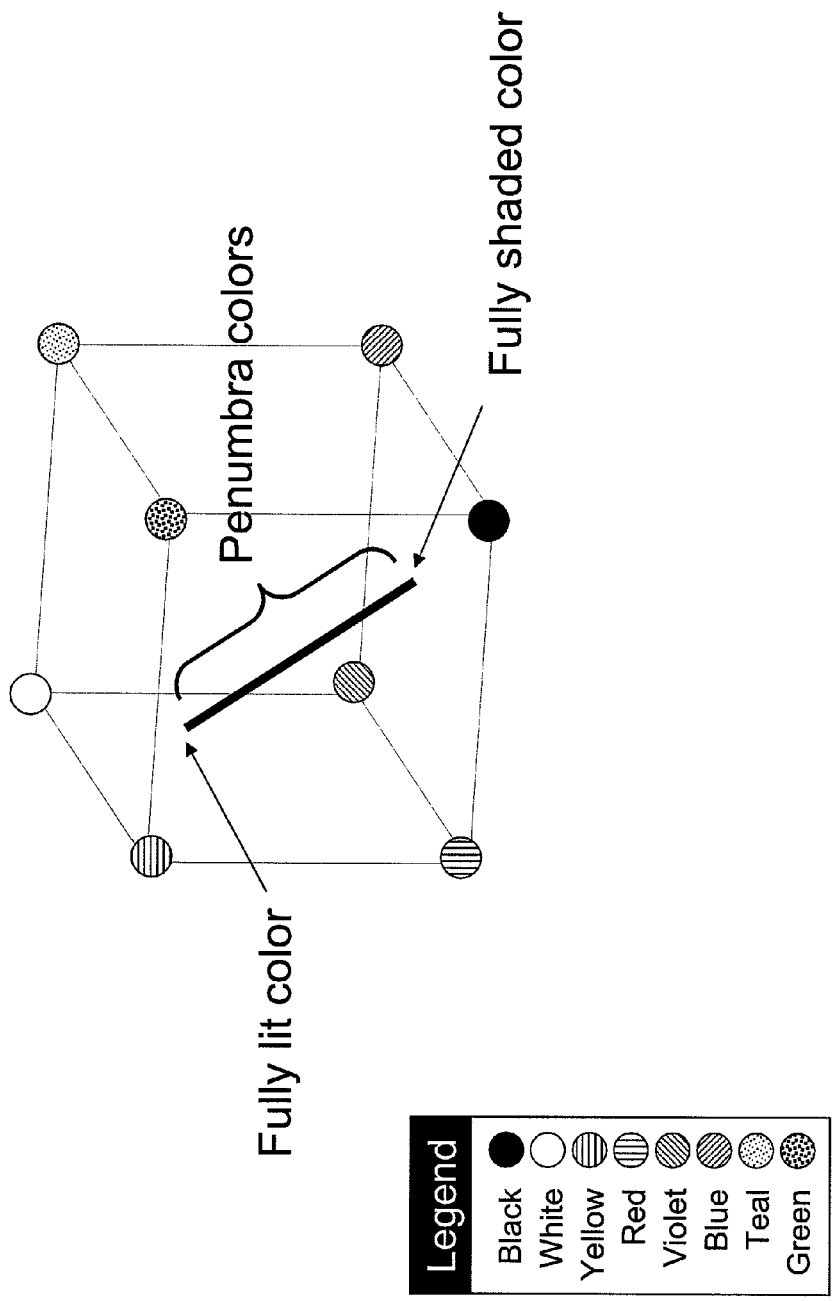
FIG. 18 is a graph in RGB color space showing colors for a material, from a fully shaded color value to a fully lit color value, as predicted by a bi-illuminant dichromatic reflection model.

As described above, the BIDR model predicts the correct color for a material, in a shadow penumbra, from full shadow to fully lit. As shown in FIG. 18, according to the prediction of the BIDR model, colors for a material, for example, in an RGB color space, from a fully shaded color value to a fully lit color value, generally form a line in the color space. In full shadow, the material is illuminated by an ambient illuminant, while when fully lit, the material is illuminated by the ambient illuminant and the direct or incident illuminant present in the scene at the time the digital image of an image file 18 was recorded.

According to the BIDR model, the illumination values in an image also define a line extending from the color of the ambient illuminant to the color of the combined ambient and direct illuminants. In log color space, the illumination line predicted by the BIDR model corresponds to the normal, N of the log color space chromaticity plane illustrated in FIG. 5.

Various inaccuracies in the generation of the illumination and material intrinsic images, as described above, can also result, for example, in illumination values in the generated intrinsic illumination image that diverge from the line for the illumination values predicted by the BIDR model. According to the present invention, the illumination line prediction of the BIDR model is used to correct such inaccuracies by modifying the illumination to be linear in log(RGB) space.

Referring once again to FIG. 17, in step 500, the CPU 12 receives as input a BIDR illumination orientation, corresponding to the normal N illustrated in FIG. 5. In the exemplary embodiment of the present invention, N is determined by the CPU 12 through execution of the routine of FIG. 7, as described above. In that case, the N determined through execution of the routine of FIG. 7 is used in both the clustering process described above, and in the BIDR model enforcement post processing technique illustrated in FIG. 17.

In the event the illumination and material reflectance images are generated via a method different from the log chromaticity clustering technique of the exemplary embodiment, the orientation N is determined by the CPU 12 in a separate step before the execution of the routine of FIG. 17, through execution of the routine of FIG. 7. When N is determined in a separate step, the CPU 12 can operate relative to either the original image or the illumination image. In addition, when the processing is based upon a user input, as described above, the user can make a selection from either the original image or the illumination image.

Moreover, in step 500, the CPU 12 also receives as input an original image (an image file 18), and the corresponding intrinsic material reflectance and illumination images determined by the CPU 12 through solution of the matrix equation shown in FIG. 13, also as described above. Optionally, the intrinsic images can be previously modified by the CPU 12 through execution of the routine(s) of either one, or both FIGS. 15 and 16.

In step 502, the CPU 12 determines the full illumination color in the illumination image. The full illumination color (ambient+direct) can be the brightest color value depicted in the illumination image. However, the brightest value can be inaccurate due to noise in the image or other outliers. In a preferred exemplary embodiment of the present invention, a more accurate determination is made by finding all illumination color values in a preselected range of percentiles of the intensities, for example, the $87^{th}$ through $92^{nd}$ percentiles, and calculating an average of those values. The average is used as the full illumination color value. Such an approach provides a robust estimate of the bright end of the illumination variation in the intrinsic illumination image.

In step 504, the CPU 12 operates to modify all of the pixels of the illumination image by projecting all of the illumination colors depicted by the pixels in the illumination image to the nearest point on a line having the orientation N (input to the CPU 12 in step 500) and passing through the full illumination color determined in step 302. Thus, the color of each pixel of the illumination image is modified to conform to the closest value required by the BIDR model prediction.

A special case exists for the pixels of the illumination image having an intensity that is greater than the full illumination color value, as calculated in step 502. The special case can be handled by the CPU 12 according to a number of different methods. In a first method, the modification is completed as with all the other pixels, by projecting each high intensity pixel to the nearest value on the illumination line. In a second method, each high intensity pixel is replaced by a pixel set at the full illumination color value. According to a third method, each high intensity pixel is kept at the color value as in the original image.

An additional method is implemented by using a weighted average for each high intensity pixel, of values determined according to the first and third methods, or of values determined according to the second and third methods. The weights would favor values calculated according to either the first or second methods when the values are similar to high intensity pixels that are not significantly brighter than the full illumination color value calculated in step 502. Values calculated via the third method are favored when values for high intensity pixels that are significantly brighter than the full illumination color value. Such a weighting scheme is useful when the I=ML equation for image characteristics is inaccurate, for example, in the presence of specular reflections.

Any known technique can be implemented to determine the relative weights for illumination values. In an exemplary embodiment of the present invention, a sigmoid function is constructed such that all the weight is on the value determined either according to the first or second methods, when the intensity of the high intensity pixel is at or near the full illumination color value, with a smooth transition to an equally weighted value, between a value determined either according to the first or second methods and a value determined according to the third method, as the intensity increases. That is followed by a further smooth transition to full weight on a value determined according to the third method, as the intensity increase significantly beyond the full illumination color value.

In step 506, the CPU 12 recalculates the intrinsic material reflectance image based upon the I=ML equation, and using the original image of the image file 18 and the illumination image, as modified in step 504. In step 508, the CPU 12 outputs intrinsic material reflectance and illumination images modified to strictly adhere to the predictions of the BIDR model.

For best results, the above-described post processing techniques can be executed in a log(RGB) space. Also, the various techniques can be executed in the order described above. Once one or more of the post processing techniques have been executed, the final modified intrinsic images can be white balanced and/or scaled, as desired, and output by the CPU 12.

A processing scale is a parameter relevant to each of the tokenization method, to identify Type C tokens, the log chromaticity clustering, and the post-processing techniques, as described above. The processing scale parameter is related to the width of shadow penumbrae appearing in an image being processed for generation of corresponding intrinsic illumination and material reflectance images. The shadow penumbrae each span an area of the image, each penumbra area depicting a transition from a fully illuminated region of the image, to an adjacent region in full shadow. An accurate estimation of the spatial distances spanned by the pixels of the penumbrae present in a scene depicted in the image, as represented by processing scale parameter information, facilitates a more accurate segregation or factorization of an image into the corresponding intrinsic images.

Figure 19:
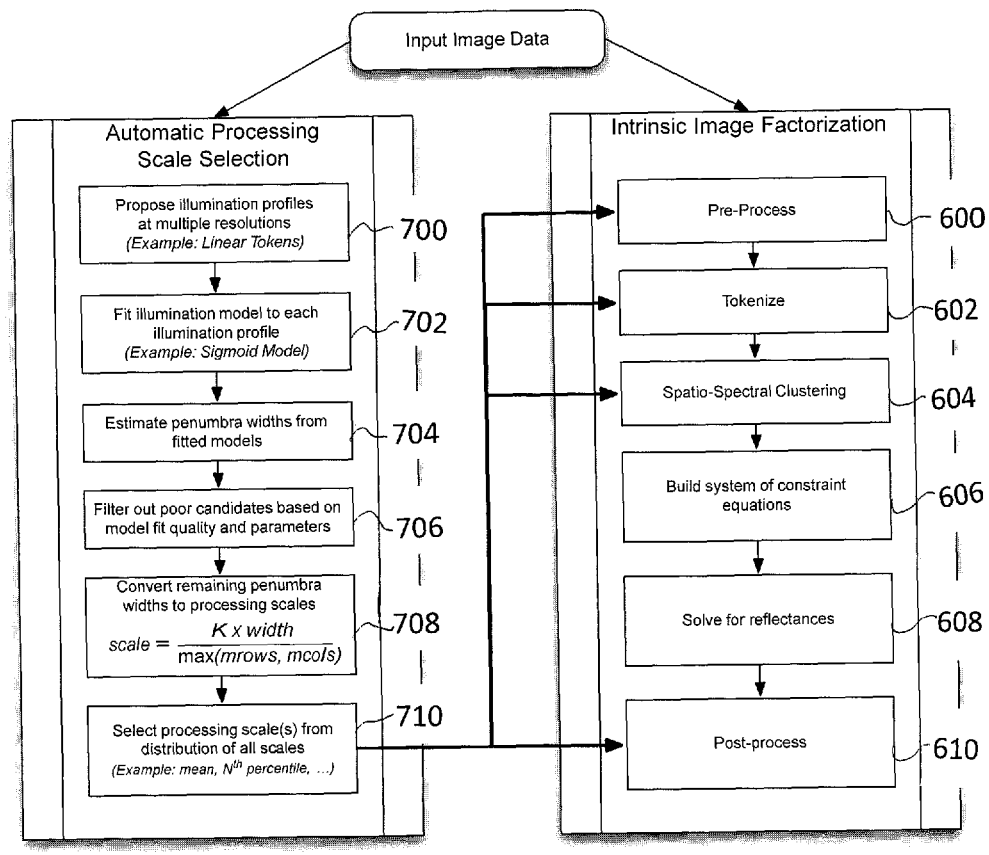
FIG. 19 is a flow chart for an automatic processing scale estimation, according to a feature of the present invention.

FIG. 19 is a flow chart for an automatic processing scale estimation technique, according to a feature of the present invention. The flow chart illustrates the automatic processing scale selection process of the exemplary embodiment of the present invention, in a flow chart section on the left side of the overall flow chart, and further illustrates a right side, high level flow chart section showing the image process to identify intrinsic images corresponding to an original image (intrinsic image factorization), as described in detail above. Flow chart lines between the left side and right side sections of the overall flow chart indicate the applications of the estimated processing scale(s), as determined in the automatic processing scale selection process, to the various steps of the intrinsic image factorization process. As shown in FIG. 19, image data, for example, an image file 18, is input to each of the automatic processing scale selection process and the intrinsic image factorization process.

As shown in the right side of FIG. 19, the intrinsic image factorization of the present invention can include a pre-process step (step 600), for example, a selective, initial blurring of the image to reduce the number of tokens to be processed in the factorization, for a faster execution time. Steps 602 to 610 of the right side section of FIG. 19 correspond to the above-described method for generating intrinsic illumination and material reflectance images.

For example, in step 602, the CPU 12 executes the routine of FIG. 3a, to identify the Type C tokens used in the generation of the intrinsic images. In step 604, the CPU 12 executes the log-chromaticity clustering of the routines of FIGS. 6-12, to identify regions of uniform reflectance. In step 606, the CPU uses the regions of uniform reflectance to build the matrix equation illustrated in FIG. 13. In step 608, the CPU 12 solves the matrix equation to generate the intrinsic images shown in FIG. 14. Finally, in step 610, the CPU 12 executes the post-processing routines of FIGS. 15-17.

According to a feature of the exemplary embodiment of the present invention, the CPU 12 operates to execute the automatic processing scale selection, shown in the left side section of FIG. 19, prior to execution of the intrinsic image factorization, to calculate processing scale information. The processing scale information is then used for a more accurate execution of steps 600, 602, 604 and 610 of the image factorization.

In step 700 of the automatic processing scale selection, the CPU 12 operates to identify prospective illumination profiles through penumbrae, at multiple resolutions of the image being processed. Each illumination profile illustrates color transitions among and the spatial extent of contiguous pixels, from pixels in full shadow, through the pixels in the penumbra, to pixels at full illumination, for example, as shown in the illustration of FIG. 18. The illumination profiles provide illumination profile information that can be used to determine width dimension information, for example, an estimate of the widths of the various penumbrae depicted in the image.

Generally, each illumination profile is selected so as to provide image data along lines orthogonal to illumination transitions depicted in the image, image data that adhere to a set of heuristics for expected illumination transitions through a shadow penumbra. For example, the pixels represented in each illumination profile have physically reasonable spectral ratios, and sufficiently bright and sufficiently dark color intensities at the ends of the respective profile, consistent with real world illumination transition conditions associated with a shadow penumbra.

In an exemplary embodiment of the present invention, step 700 is implemented by identifying linear tokens in the image being processed. A linear token is a nonhomogeneous token comprising a connected region of the image wherein adjacent pixels of the region have differing color measurement values that fall within a cylinder in RGB space, from a dark end (in shadow) to a bright end (lit end), along a positive slope. The cylinder configuration is predicted by the bi-illuminant dichromatic reflection model (BIDR model). As described above, the BIDR model predicts the correct color for a material, in a shadow penumbra, from full shadow to fully lit. Each linear token, therefore, provides a candidate image region that likely corresponds to a line passing through a penumbra depicted in the image.

U.S. Pat. No. 7,995,058 discloses a technique for analyzing pixels of an image to identify contiguous pixels forming linear tokens throughout the image. In step 700, the CPU 12 is operated to execute the technique taught in U.S. Pat. No. 7,995,058, to identify a set of linear tokens in the image being processed, executing the technique once at each of several preselected resolutions of the image, for example, at the original resolution of the image, and several down-sampled versions of the image.

Figure 20:
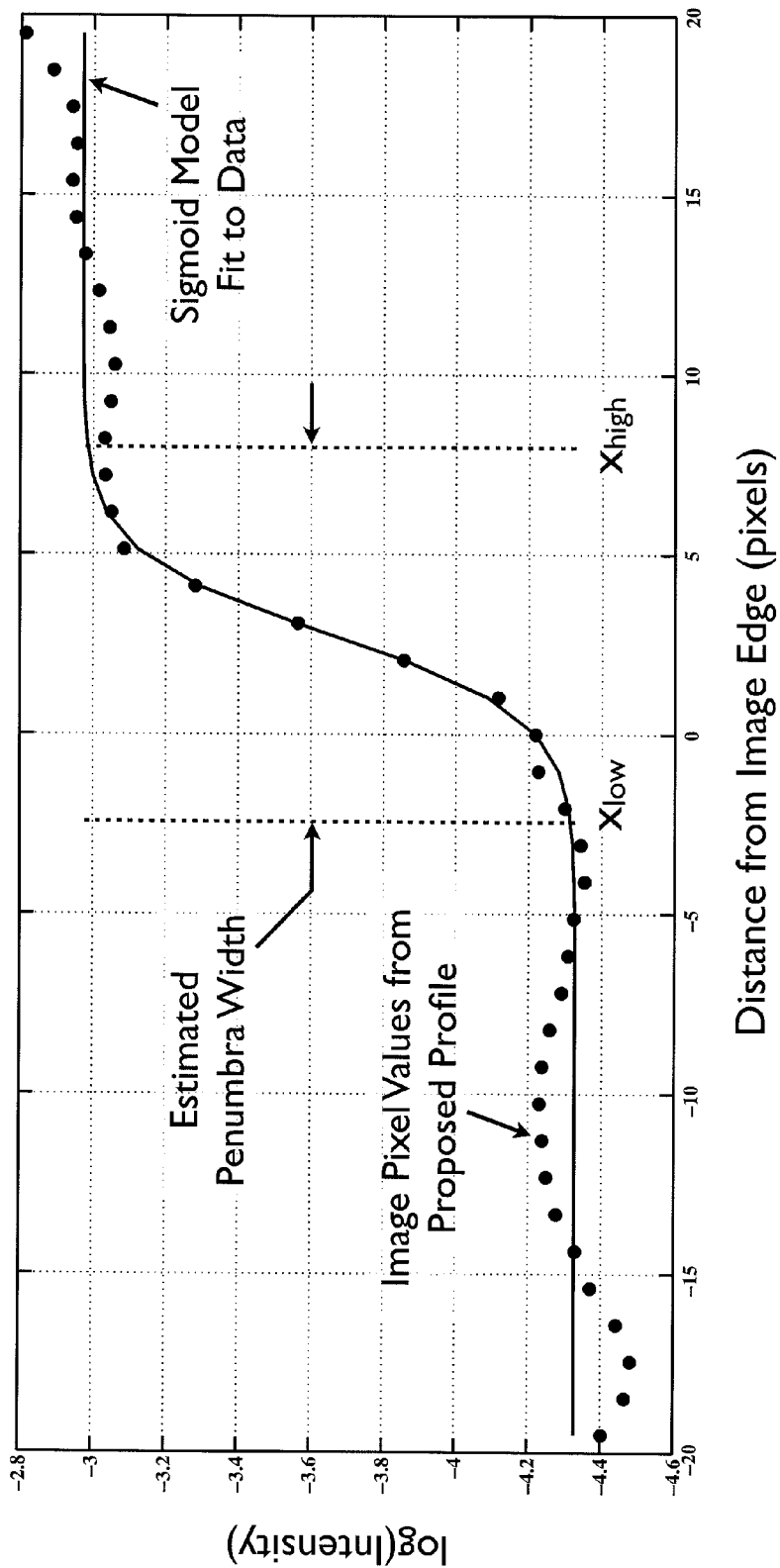
FIG. 20 shows a graph for a sigmoid model used to calculate a penumbra width, for use in the automatic processing scale estimation illustrated in the flow chart of FIG. 19.

In step 702, the CPU 12 is operated to fit an illumination model to each of the illumination profiles, for example, as represented by the linear tokens. For example, a 4-parameter sigmoid model is applied to each of the RGB bands of the pixels of each linear token identified by the CPU 12 in step 700. The sigmoid can be determined using a known technique, such as the Levenberg-Marquardt method. FIG. 20 shows a graph illustrating a sigmoid model for one band of the pixels of an identified linear token, used to calculate a penumbra width.

According to a feature of the exemplary sigmoid embodiment of the present invention, the four parameters of the sigmoid model include xcen, the center of the sigmoid, relative to the distance from image edge position, as shown in FIG. 20, s, slope (the rate of change measured by intensity vs distance from image edge), yscale, the difference, in intensity, between the flat bright and dark portions of the profile, and yshift, the vertical shift (in intensity) required to align the sigmoid model with the dark portion of the underlying pixel data.

In step 704, the CPU 12 operates to estimate penumbrae widths, from lit to dark, as a function of the fitted sigmoid parameters. The length of each particular penumbra can be expressed relative to x positions, $x_{low}$ and $x_{high}$, the positions at which the sigmoid model for the respective penumbra reaches the minimum and maximum values, respectively (as shown by the vertical dashed lines in the graph of FIG. 20, the left vertical dashed line corresponds to the $x_{low}$ position and the right vertical dashed line corresponds to the $x_{high}$ position). The calculation of the penumbra width w for a particular penumbra is performed (based upon a determination of the positions within a fraction, p, of the minimum and maximum values), as follows:

$$y_{low} = \log((1-p)/p)$$

$$y_{high} = \log(p/(1-p)),$$

then $$x_{low} = -y_{low} - xcen/s,$$

and $$x_{high} = y_{high} - xcen/s,$$

with $$w = |x_{high} - x_{low}|$$

wherein p is a given fraction to quantify the proximity of $x_{low}$ and $x_{high}$ to the sigmoid model. In the exemplary embodiment of the present invention, p is set at 0.01.

In step 706, the CPU 12 operates to filter out illumination profiles that are deemed unlikely to correspond to an illumination transition of a shadow penumbra. The goal is to eliminate from further processing any of the candidate illumination profiles represented by, for example, the linear tokens, that do not reflect such an illumination transition. Step 706 is executed based upon information provided by the fitted sigmoid parameters. For example, a check of the signs of the slope parameters, s, of the sigmoid model of each of the RGB bands of a linear token can be made to verify that all of the bands indicate either an increase or decrease along the transition, as occurs in an illumination transition. If one of the bands increases while the other bands decrease, the corresponding linear token does not correspond to an illumination transition, and is removed from the process.

Further checks can include, for example, thresholds on the fit quality (e.g. in terms of RMS error) and verification that penumbra widths among the bands of an illumination profile agree with one another. The result of step 706 is a reduction of the number of candidate illumination profiles to include profiles each representing a high likelihood of corresponding to an illumination transition.

In step 708, the CPU 12 operates to calculate a processing scale for each of the remaining candidate illumination profiles i, for example, as represented by the linear tokens, as a function of the penumbra widths $w_i$ calculated in step 704. In an exemplary embodiment of the present invention, each processing scale is calculated as a function that is proportional to the calculated width $w_i$ to ensure that the processing scale represents the distance between pixels that are fully lit and pixels in full shadow. Accordingly, the processing scale calculation is adjusted by K, a constant of proportionality, to expand the distance between the $x_{low}$ and $x_{high}$ positions, to ensure that the analysis is relative to fully lit and fully shadowed regions of the image when performance depends upon the processing scale parameter.

Thus, each processing scale, proc_scale, is calculated, as follows:

$$\text{proc\_scale}_i = K^* w_i / \max(N_{rows}, M_{cols})$$

wherein $N_{rows}$, $M_{cols}$ correspond to the number of rows and columns of pixels in the image being processed, as shown, for example, in FIG. 2. The $N_{rows}$, $M_{cols}$ denominator is used to normalize the parameter quantity so as to be independent of the specific size of a particular image, and thus be comparable across images of all sizes.

From the set of processing scales, proc_scale, calculated by the CPU 12 in step 708, the CPU 12 is operated to select one or more of the processing scales for use in the intrinsic image factorization shown in the right side section of the flow chart of FIG. 19 (step 710). In one exemplary embodiment of the present invention, execution of step 710 is implemented such that a single processing scale is calculated from the average of the distribution of processing scales, as follows:

$$\text{proc\_scale} = 1/N_{profiles} \Sigma \text{ (from i=1 to } N_{profiles})\text{proc\_scale},$$

wherein $N_{profiles}$ is the number of candidate illumination profiles i, from step 708.

In other exemplary embodiments of the present invention, for implementation of step 710, the CPU 12 specifies a percentile of the distribution of processing scales, for example, a median ($50^{th}$ percentile) or the $90^{th}$ percentile, for use in the intrinsic image factorization, or determines a set of spatially-varying processing scales. For the set of spatially-varying processing scales, the spatial positions of the illumination profiles are considered to select representative processing scales at various locations within the image, according to local distributions of proposed scales, or by clustering, using, for example, a mean-shift or K-means clustering technique based upon spatial position and scale as dimensions for the clustering.

Upon completion of steps 700-710, the CPU 12 uses the estimated processing scale(s) in the execution of steps 600, 602, 604 and 610 of the image factorization shown in the right side section of the flow chart of FIG. 19, as noted above. In the pre-process of step 600, for a selective, initial blurring of the image to reduce the number of tokens to be processed in the factorization, the processing scale is used to control the bandwidth of the blur filter kernel.

Relative to the tokenization of step 602, the spatial positions of the tokens in the clustering of step 604 can be based upon the centroid position of each token. To avoid requiring a measure of spatial proximity in the clustering of step 604 that is more complex than simple Euclidean distance between centroid positions, the growth process in the tokenization can be implemented so as to limit maximum token size. The maximum token size is set such that the distance between a token and the neighboring tokens, based upon centroid distances, is assured to be small enough such that the respective token can potentially be clustered with the neighboring tokens based upon the spatial and spectral distances used in the clustering of step 604. For example, a larger processing scale permits tokens to be grown to larger sizes, since the clustering algorithm can consider centroid positions that are further apart. Accordingly, maximum token size is set as a function of the processing scale.

As noted, the distance between the centroid positions of tokens is used as a dimension in the log chromaticity clustering of step 604. The clustering is also based upon log chromaticity values. To make the combined dimensions of the centroid distance and chromaticity values, which have different units, numerically compatible, the spatial dimension is scaled as a function of the processing scale. Thus, the clustering can be implemented relative to a combined space with dimensions corresponding to chromaticity value and spatial position, to allow for a single clustering radius. The processing scale is used to adjust the requisite relative weight between the centroid distances and log chromaticity values such that a larger processing scale makes more spatially-separated centroid positions appear closer together (relative to the corresponding log chromaticity distance) for purposes of clustering.

During the post-processing phase of the intrinsic image factorization, a smoothing operator such as, for example, a bilateral filter, can optionally be applied to the illumination image (with a corresponding adjustment to the material reflectance image). This provides an adjustment to the smoothness of the illumination image, allowing control over how much detail appears in the final illumination vents material reflectance result. The spatial bandwidth is directly proportional to the processing scale parameter, such that a larger processing scale results in a more spatially smooth illumination field when a smoothing operator is used.

In the preceding specification, the invention has been described with reference to specific exemplary embodiments and examples thereof. It will, however, be evident that various modifications and changes may be made thereto without departing from the broader spirit and scope of the invention as set forth in the claims that follow. The specification and drawings are accordingly to be regarded in an illustrative manner rather than a restrictive sense.

What is claimed is:

1. An automated, computerized method for processing an image, comprising the steps of:
   providing an image file depicting the image, in a computer memory;
   calculating processing scale parameter information as a function of width dimension information for penumbrae depicted in the image; and
   generating, from the image, intrinsic illumination and material reflectance images corresponding to the image using the processing scale parameter information, wherein the intrinsic illumination image represents intensity and color of light incident upon each point on surfaces depicted in the image and the intrinsic material reflectance image represents reflectance properties of surfaces depicted in the image.

2. The method of claim 1 wherein the width dimension information for the penumbrae is calculated relative to illumination profile information for the image.

3. The method of claim 2 including the further step of identifying linear tokens in the image, and wherein the illumination profile information is determined from the linear tokens.

4. The method of claim 2 wherein the illumination profile information is analyzed to verify correspondence to illumination transitions caused by penumbrae.

5. The method of claim 2 including the further step of fitting the illumination profile information to an illumination model.

6. The method of claim 5 wherein the illumination model comprises a sigmoid model.

7. The method of claim 5 including the further step of using the illumination model to calculate the width dimension information for the penumbrae.

8. The method of claim 1 wherein the processing scale parameter information comprises a processing scale parameter determined as a function of a set of processing scale parameters corresponding to individual penumbra among the penumbrae depicted in the image.

9. The method of claim 1 wherein the processing scale parameter information comprises a set of spatially-varying processing scales.

10. A computer program product, disposed on a non-transitory computer readable media, the product including computer executable process steps operable to control a computer to: provide an image file depicting an image, in a computer memory, calculate processing scale parameter information as a function of width dimension information for penumbrae depicted in the image, and generate, from the image, intrinsic illumination and material reflectance images corresponding to the image using the processing scale parameter information, wherein the intrinsic illumination image represents intensity and color of light incident upon each point on surfaces depicted in the image and the intrinsic material reflectance image represents reflectance properties of surfaces depicted in the image.

11. The computer program product of claim 10 wherein the width dimension information for the penumbrae is calculated relative to illumination profile information for the image.

12. The computer program product of claim 11 including the further process step to identify linear tokens in the image, and wherein the illumination profile information is determined from the linear tokens.

13. The computer program product of claim 11 wherein the illumination profile information is analyzed to verify correspondence to illumination transitions caused by penumbrae.

14. The computer program product of claim 11 including the further process step to fit the illumination profile information to an illumination model.

15. The computer program product of claim 14 wherein the illumination model comprises a sigmoid model.

16. The computer program product of claim 14 including the further step to use the illumination model to calculate the width dimension information for the penumbrae.

17. The computer program product of claim 10 wherein the processing scale parameter information comprises a processing scale parameter determined as a function of a set of processing scale parameters corresponding to individual penumbra among the penumbrae depicted in the image.

18. The computer program product of claim 10 wherein the processing scale parameter information comprises a set of spatially-varying processing scales.

* * * * *